United States Patent [19]
Watanabe et al.

[11] Patent Number: 6,104,381
[45] Date of Patent: *Aug. 15, 2000

[54] CHARACTER INPUT APPARATUS

[75] Inventors: Kenji Watanabe; Takanobu Kameda; Tomoyuki Shimmura, all of Tokyo; Hitoshi Hayama, Suwa, all of Japan

[73] Assignees: King Jim Co., Ltd.; Seiko Epson Corporation, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/778,709

[22] Filed: Dec. 27, 1996

[30] Foreign Application Priority Data

Dec. 28, 1995 [JP] Japan .................................. 7-342593
Dec. 28, 1995 [JP] Japan .................................. 7-342594
Jan. 5, 1996 [JP] Japan .................................. 8-000317

[51] Int. Cl.⁷ ................................................... G09G 5/08
[52] U.S. Cl. ..................................... 345/160; 345/141
[58] Field of Search .......................... 345/160, 145, 345/146, 184, 141, 157, 168, 156, 127, 128, 129, 130, 142; 395/110

[56] References Cited

U.S. PATENT DOCUMENTS

| | | | |
|---|---|---|---|
| 4,190,835 | 2/1980 | Buynak | 345/141 |
| 4,739,318 | 4/1988 | Cohen | 345/142 |
| 4,915,027 | 4/1990 | Ishibashi et al. | 101/486 |
| 4,927,278 | 5/1990 | Kuzuya et al. | 400/208 |
| 4,974,183 | 11/1990 | Miller | 345/157 |
| 5,230,572 | 7/1993 | Hirono et al. | 400/3 |
| 5,270,689 | 12/1993 | Hermann | 345/145 |
| 5,440,325 | 8/1995 | Edmark, III | 345/145 |
| 5,634,134 | 5/1997 | Kumai et al. | 707/536 |
| 5,697,504 | 12/1997 | Hiramatsu et al. | 209/546 |
| 5,713,033 | 1/1998 | Sado | 345/353 |

FOREIGN PATENT DOCUMENTS

| | | |
|---|---|---|
| 52-132653 | 11/1977 | Japan . |
| 1135666 | 5/1989 | Japan . |
| 1102922 | 7/1989 | Japan . |
| 1102923 | 7/1989 | Japan . |
| 1102924 | 7/1989 | Japan . |
| 1135541 | 9/1989 | Japan . |

OTHER PUBLICATIONS

WordPerfect Reference manual, WordPerfect Corporation, 1993, Orem, Utah, pp. 71–73, 207, 567–568, 707 and 742.

*Primary Examiner*—Chanh Nguyen
*Attorney, Agent, or Firm*—Lorusso & Loud

[57] ABSTRACT

A character input apparatus determines a state of an input character string to control the functions performed by operation of any of a plurality of cursor moving keys. The last entered character is displayed in the last position of a six character display and is displayed as flashing, negative or positive indicating an undetermined state, tentatively determined state or determined state of the character string. In a determined state, operation of a cursor moving key results in corresponding movement of the cursor. In the undetermined state, successive operation of the rightward key results in extraction and display of successive candidate characters previously selected and stored by an association with the character in the sixth display position. In the tentatively determined state, successive operation of the upward key results in successive extraction and display of successive kanji characters previously selected and stored by association with tentative determined kana character or characters.

14 Claims, 15 Drawing Sheets

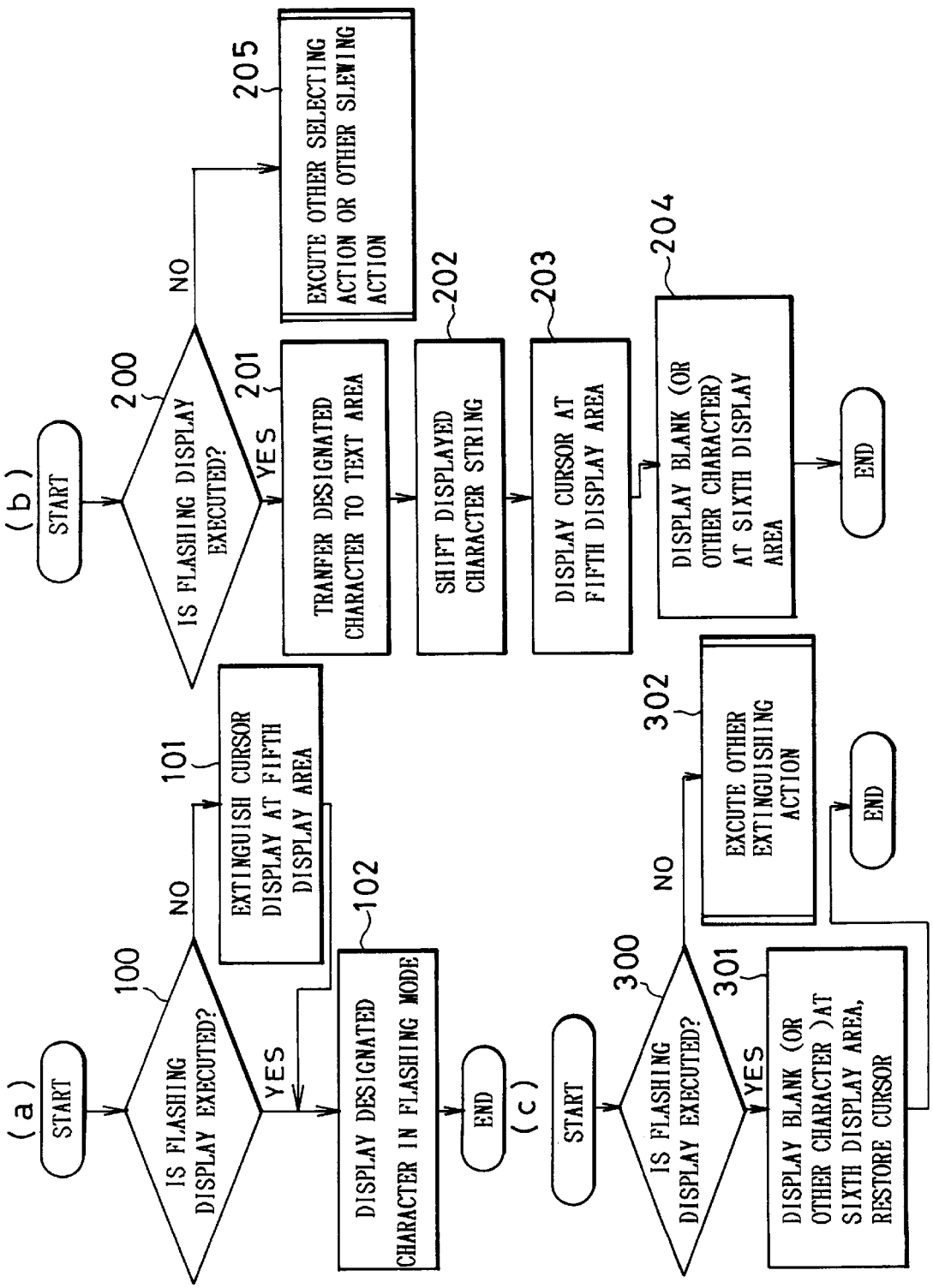

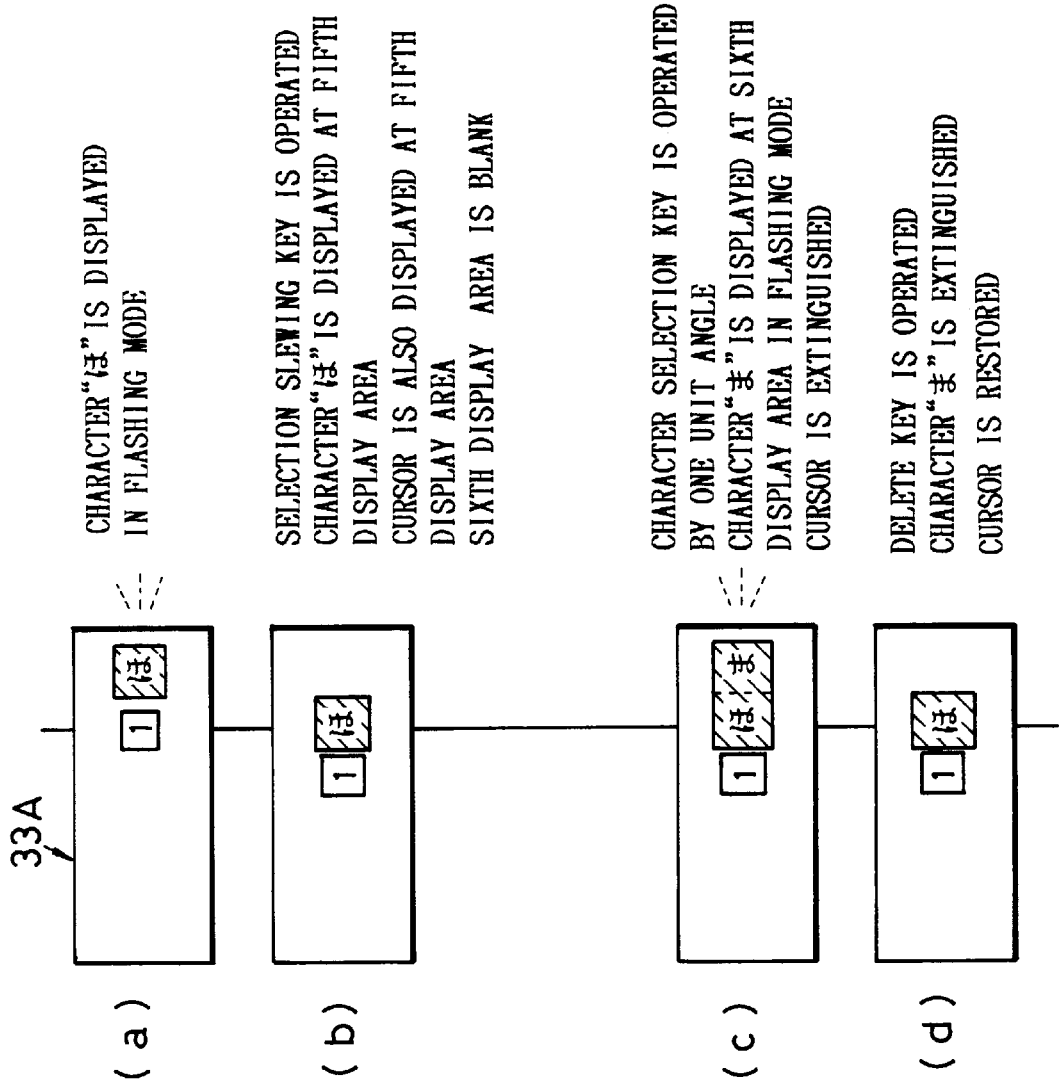

F I G. 1 0

| CHARACTER IN TEXT | | | TYPE OF KEY | | | |
|---|---|---|---|---|---|---|
| POSITIVE | NEGATIVE | FLASHING | CURSOR IS MOVED UPWARD | CURSOR IS MOVED DOWNWARD | CURSOR IS MOVED LEFTWARD | CURSOR IS MOVED RIGHTWARD | SELECTION |
| × | × | × | WARNING | WARNING | WARNING | WARNING | SLEWING |
| × | × | ○ | WARNING | WARNING | SMALL CHARACTER | あァA | FLASHING→NEGATIVE |
| × | ○ | × | NONCONVERSION | CONVERSION | ← | → | NONCONVERSION IS DETERMINED |
| ○ | × | × | ← | → | ↓ | ↑ | SLEWING |
| × | ○ | ○ | NONCONVERSION | CONVERSION | SMALL CHARACTER | WARNING | FLASHING→NEGATIVE |
| ○ | × | ○ | ← | → | SMALL CHARACTER | あァA | FLASHING→NEGATIVE |
| ○ | ○ | × | NONCONVERSION | CONVERSION | ← | → | NONCONVERSION IS DETERMINED |
| ○ | ○ | ○ | NONCONVERSION | CONVERSION | SMALL CHARACTER | WARNING | FLASHING→NEGATIVE |

FIG. 12
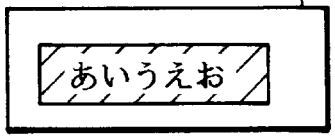
(a) NEGATIVE CHARACTERS "あいうえお" ARE DISPLAYED AT FIRST LINE
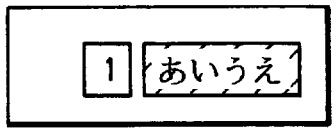
(b) CURSOR IS MOVED LEFTWARD TWICE
(c) CURSOR IS MOVED UPWARD TWICE
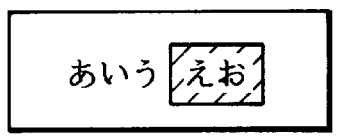
(d) CURSOR IS MOVED RIGHTWARD TWICE
FIG. 13
| READING CODE | CODE OF CANDIDATE CHARACTER |
|---|---|
| あ | 亜 吾 阿 ---------- |
| EN SPACE<br>EM "1"<br>EM "2" | EM SPACE    EN SPACE<br>EM "1"    EN "1"    1/3 "1"<br>EM "2"    EN "2"    1/3 "1" |
| KUTEN | KUTEN PERIOD |

CHARACTER INPUT APPARATUS

BACKGROUND OF THE INVENTION

1. Field of the Invention

The present invention relates to a character input apparatus for introducing inputted characters. The present invention can be applied to, for example, a seal producing apparatus adapted to form unevenness corresponding to an inputted character string, and a tape printing apparatus adapted to print an inputted character string on a tape.

2. Description of the Related Art

A seal producing apparatus, a tape printing apparatus, and the like are required to be offered at a low price because their uses are limited. Further, since the number of characters formed at a time on a seal face member or a tape is small, such apparatuses are configured not as character input apparatus having a separate keyboard but as a character input apparatus having an operating section for inputting characters provided on a casing of the apparatus body.

Further, in these apparatuses, the area of a panel for inputting characters must be made small because a large space is occupied by a mechanical structure for mounting a seal to form unevenness on the seal face member or a mechanical structure for transferring or printing on a tape. Therefore, these types of character input apparatuses employ a character selection dial key (hereinafter referred to as "character selection dial") adapted to be rotated to designate an input candidate character situated at a position opposite to a character designation mark.

In a character input apparatus in which a depression key designates the character, when the control unit is supplied with an operation signal from the depression key, the control unit can immediately decide which character is selected. In contrast, in a character input apparatus employing a character selection dial, the control unit cannot immediately decide that the character represented by the character signal sent from the character selection dial is designated because character signals are always outputted from the character selection dial. Therefore, the control unit determines that the character represented by the character signal is selected when a select key for determining selection of the character is operated and introduce the selected character.

In a character input apparatus employing a character selection dial before the select key is operated, the character designated by the character selection dial is displayed so that the user can recognize and select the character designated by the character selection dial. Also, after the select key is operated, the selected character is displayed at the display unit in such a manner that the user can be informed of the selection of the character.

Such a technique of changing display modes before and after the operation of the select key is disclosed in Japanese Utility Model Application Laid-Open 1-102922, Japanese Utility Model Application Laid-Open 1-102923, Japanese Utility Model Application Laid-Open 1-102924, and Japanese Utility Model Application Laid-Open 1-135541.

The techniques disclosed in these applications are the same in basic configuration. Namely, in these techniques, a dial character display area portion for displaying a character designated by the character selection dial is fixedly provided in the display area of a display unit. Also, the character designated by the character selection dial is displayed at the dial character display area portion before and after the select key is operated. Further, after the select key is operated, the selected character is displayed with a cursor at the dial character display area portion, thereby clearly showing that the character is selected. Thereafter, when the character selection dial is rotated, or when the select key is operated again, the character string having been displayed is shifted, and the character designated by the character selection dial is displayed at the dial character display area portion in such a manner that the user can be informed that the character designed by the character selection dial is in a candidate state in which no selection is instructed.

However, in the conventional method of displaying the character designated by the character selection dial, the displaying manner merely changes from the state in which a cursor is absent to the state in which a cursor is present. Therefore, the users cannot easily recognize with their eyes that the operation of the select key is accepted, and must intentionally verify the presence and absence of the cursor. Accordingly, users not accustomed to operating the apparatus may become anxious about whether or not the operation of the select key is accepted, and happen to operate the select key subsequently by mistake. In the conventional technique, even when the select key is operated subsequently by mistake, selection of the character designated by the character selection dial is determined every time the select key is operated, thereby causing a problem that an unnecessary character is inputted.

Meanwhile, in seal producing apparatuses or tape printing apparatuses, in order to compensate for the problem that the panel for inputting character must become small, there have been proposed various approaches, such as making the size of the key as small as possible, employing a dial key, and allocating a plurality of functions to one key, although operability in input operation is lowered.

When the above problem is tried to be overcome by enhancing the key arrangement efficiency, namely, by allocating a plurality of functions to one key, there can be proposed a technique of allocating another function to the keys each of which is allocated only a single function because it is frequently used.

However, when a plurality of functions are allocated to one key, it is necessary to operate another key simultaneously with or before the operation of the one key in order to cause the control unit to distinguish one function from another, so that operability is lowered.

Incidentally, the problem that operability is somewhat lowered when the key arrangement efficiency is enhanced also arises in the case of a word processor, a personal computer, or the like, which has a separate keyboard.

Meanwhile, in seal producing apparatuses, the object to be transferred is a seal face member, and in tape printing apparatuses, the object to be printed is a label. Therefore, to prepare such an object to be transferred or printed with these apparatuses, the users require these apparatuses to have more various types of characters arranged in a mixed manner compared with the case of using other character information processors. To meet this requirement, in the conventional seal producing apparatuses and tape printing apparatuses, various character sizes are provided, and a part of the character sizes can be easily changed. As such various types of character sizes, a character size in which the number of dots in the widthwise direction is the same as that in the lengthwise direction, and a character size in which the number of dots in the widthwise direction is smaller than that in the lengthwise direction can be mentioned. Thus, the em characters have various character sizes, and switching therebetween can be performed easily. For this reason, in the conventional seal producing apparatuses or tape printing apparatuses, en characters are not provided. Accordingly, when the user want to obtain a character having a character size as small as an en character, the user have to use a smaller em character size.

Accordingly, with respect to a space, only a space having a size of an em character (hereinafter, referred to as em space) was provided.

Unlike a character information processor of a general type, such as a word processor, with which general-type documents are prepared, in the seal producing apparatuses or tape printing apparatuses, change of paragraph rarely occurs. Also, a character string rarely contains spaces. As examples of a character string containing a space when using seal producing apparatuses, a character string consisting of a family name and a first name, and a character string consisting of a department name and a section name of a company can be mentioned. Thus, such character string is limited. In these character strings, the space is provided for clear separation between the family name and the first name, or between the department name and the section name.

Seal producing apparatuses or tape printing apparatuses are endowed with a function of automatically deciding a pitch between characters. Under the condition that this function is activated, when the above-mentioned space is provided in a character string for clear distinction between the family name and the first name or between the department name and the section name, the blank formed by the space become considerably large because the space is an em space, so that the resulting transferred or printed matter may give a strange impression to the users. Accordingly, the user is tempted, for example, to employ an em space between a family name consisting of two characters and a first name consisting of two characters, while an en space between a family name consisting of two characters and a first name of three characters.

To solve the above problem, there has been already proposed an apparatus in which, with respect to a space, an en space whose widthwise length is half the widthwise length of an em space is provided as well as an em space, while the other characters are all em characters.

Meanwhile, in the case where an em space or an en space is selectively inputted, as in the case of inputting family and first names, kanjis (Chinese characters) are positioned before and behind the space in many cases. In this case, since the space is not an object of kana-kanji conversion as in the case of alphabets, the inputting procedure must consist of determining the kanji positioned before the space, inputting the space, and determining the kanji positioned behind the space. Namely, it is impossible to perform kanji determining operation at one time after completing all the inputting operation.

Further, in the conventional art, in view of the fact that provision of two separate keys for operating two different types of spaces may cause a confusion of the user's operation, only an input of an em space (or an en space) which is considered to be basic is associated with an ordinary input operation while the other en space (or em space) is inputted through symbol selecting operation. Accordingly, when kanjis are input before and behind the space, if the space is not the basic one, the input operation becomes considerably complicated.

The problem caused basically by no provision of the en space also arises in the case of inputting numeric characters. For example, when it is necessary to input two pairs of two digit numeric characters, the respective pairs defining month and day are input as en characters, there are problems that determining operation cannot be performed through kanji determining operation and that en numeric character must be selected through symbol input.

Further, the character strings to be inputted into a seal producing apparatus or a tape print apparatus is different from those of an ordinary sentences. That is, user often wants to use a comma, a period or the like against the rule of Japanese sentences. For example, the user sometimes wants to separate the words of the Japanese language with a comma. In this case, there is a problem that determination of the selection cannot be performed through an kanji determining action.

SUMMARY OF THE INVENTION

The present invention has been accomplished in view of the above problems.

It is an object of the present invention to provide a character input apparatus wherein the user can be reliably informed of whether or not selecting operation of the character designated by character selecting means is accepted.

It is another object of the present invention to provide a character input apparatus wherein both the key arrangement efficiency and the operability is enhanced.

It is still another object of the present invention to provide a character input apparatus wherein input operability is enhanced concerning the characters on which conversion cannot be attained from a tentatively determined character in the conventional art.

To achieve the above objects, the character input apparatus according to the first aspect of the present invention comprises:

character selecting means for outputting a signal corresponding to a desired character among a plurality of candidate characters arranged in a prescribed order;

selection determining means for determining selection of a character associated with the signal outputted from the character selecting means;

display means for displaying an inputted character string; and display control means for exercising control of display such that a candidate character is displayed at a prescribed display area of display means in response to the signal sent from the character selecting means, and that the respective characters having been displayed in the display areas are shifted and displayed when selection of a character out of the candidate characters is determined by the selection determining means.

In the character input apparatus according to the first aspect of the present invention, when selection of a character out of candidate characters is determined by the selection determining means, the characters displayed in the display area are shifted and displayed, so that the user can confirm that the selecting operation is accepted.

The character input apparatus according to the second aspect of the present invention comprises:

input state judging means for judging a current character-string-input-state; and operation-corresponding-action executing means for executing, when an operation signal is supplied from any one of cursor moving keys, an action in accordance with an operation-corresponding-action content determined by the operation signal supplied from the cursor moving key and the character-string-input-state judged by the input sate judging means.

Depending on character input states, when a relative movement of the cursor with respect to the character is designated, the movement of the cursor is not accepted.

In view of this point, in the character information apparatus according to the second aspect of the present invention, the operation of the cursor moving key performed in a character input state which does not accept cursor movement is accepted another instruction for an action associated with character input, so that the cursor moving key is associated with two functions (one of them is a cursor moving function). Since the action executed when a cursor moving key is operated is determined depending on character input states, it is unnecessary to operate another key simultaneously with or before the operation of the cursor moving key for distinguishing the two functions associated with the cursor moving key.

As described above, in the character input apparatus according to the second aspect of the present invention, two functions are associated with a cursor moving key, the number of keys to be provided and an area necessary for key input section can be reduced.

The character input apparatus according to the third aspect of the present invention comprises: character selecting means, having a torus-shaped portion, for outputting a signal corresponding to a desired character out of a plurality of candidate characters arranged in a prescribed order on the torus-shaped portion, wherein the cursor moving keys are arranged inside of the torus-shaped portion of the character selecting means. With this configuration, an area necessary for the key input section can be reduced.

The character input apparatus according to the fourth aspect of the present invention comprises:

input means for inputting a tentatively determined character which can be converted into an associated character; and converting means for converting the tentatively determined character into the associated character, wherein the converting means comprises:

conversion instructing means for issuing an instruction of converting the tentatively determined character;

conversion-information storing means for storing a plurality of candidate characters each of which is associated with the tentatively determined character and can be converted;

candidate extracting means for extracting a character which can be converted from the conversion-information storing means when the instruction for conversion is issued by the conversion instructing means; and candidate displaying means for displaying the candidate extracted by the candidate extracting means; and the conversion information storing means stores characters having different character attributes as a plurality of the candidate characters associated with the tentatively determined character.

In the fourth aspect of the present invention, with respect to the characters having different character attributes, a tentatively determined character can be converted into a character associated the tentatively determined character. With this configuration, for example, it is possible to include en and em spaces in the objects of kana-kanji conversion, and to perform selective input between an en space and an em space through a kana-kanji converting operation. Likewise, it is possible to include reduced-size numeric characters, enlarged-size numeric characters and em numeric characters in the objects of kana-kanji conversion, and to perform selective input among a reduced-size numeric character, an enlarged-size numeric character and an em numeric character through a kana-kanji converting operation. Accordingly, operability can be enhanced when inputting, for example, a character string consisting of a kanji, a space and a kanji in this order, and a character string consisting of a kanji, a numeric character and a kanji in this order.

The character input apparatus according to the fifth aspect of the present invention comprises:

input means for inputting a tentatively determined character which can be converted into an associated character; and converting means for converting the tentatively determined character into the associated character, wherein the converting means comprises:

conversion instructing means for issuing an instruction of converting the tentatively determined character;

conversion-information storing means for storing a plurality of candidate characters each of which is associated with the tentatively determined character and can be converted;

candidate extracting means for extracting a character which can be converted from the conversion-information storing means when the instruction for conversion is issued by the conversion instructing means; and candidate displaying means for displaying the candidate extracted by the candidate extracting means; and the conversion information storing means stores relationships among editorial symbols of different languages.

In the fifth aspect of the present invention, with respect to editorial symbols of different languages, a tentatively determined character can be converted into a character associated the tentatively determined character. With this configuration, for example, it is possible to include Japanese punctuation symbols and their corresponding European language punctuation symbols in the objects of kana-kanji conversion, and to perform selective input between Japanese punctuation symbols and their corresponding European punctuation symbols through a kana-kanji converting operation. Accordingly, operability is enhanced when inputting, for example, a character string consisting of a kanji, a punctuation symbol (in particular, an European language punctuation symbol) and a kanji in this order.

BRIEF DESCRIPTION OF THE DRAWINGS

Other features, objects and advantages of the present invention will become apparent from the following description of the preferred embodiments with reference to the drawings in which like reference characters designate like or corresponding parts throughout several views, and in which:

FIG. 8 is a flowchart showing a typical character input processing according to the first aspect of the present invention;

FIG. 9 is a view illustrating an example of how displayed contents are changed in accordance with the operations in the embodiment according to the first aspect of the present invention;

FIG. 10 is a view illustrating actions executed when a cursor moving key is operated in the embodiment according to the second and third aspects of the present invention;

FIG. 12 is a view illustrating how displayed contents change in accordance with the operation in the embodiment according to the second and third aspects of the present invention;

FIG. 13 is a view illustrating an example of a configuration of dictionary data for kana-kanji conversion in the embodiment according to the fourth and fifth aspects of the present invention;

DETAILED DESCRIPTION OF THE INVENTION

Figure 1:
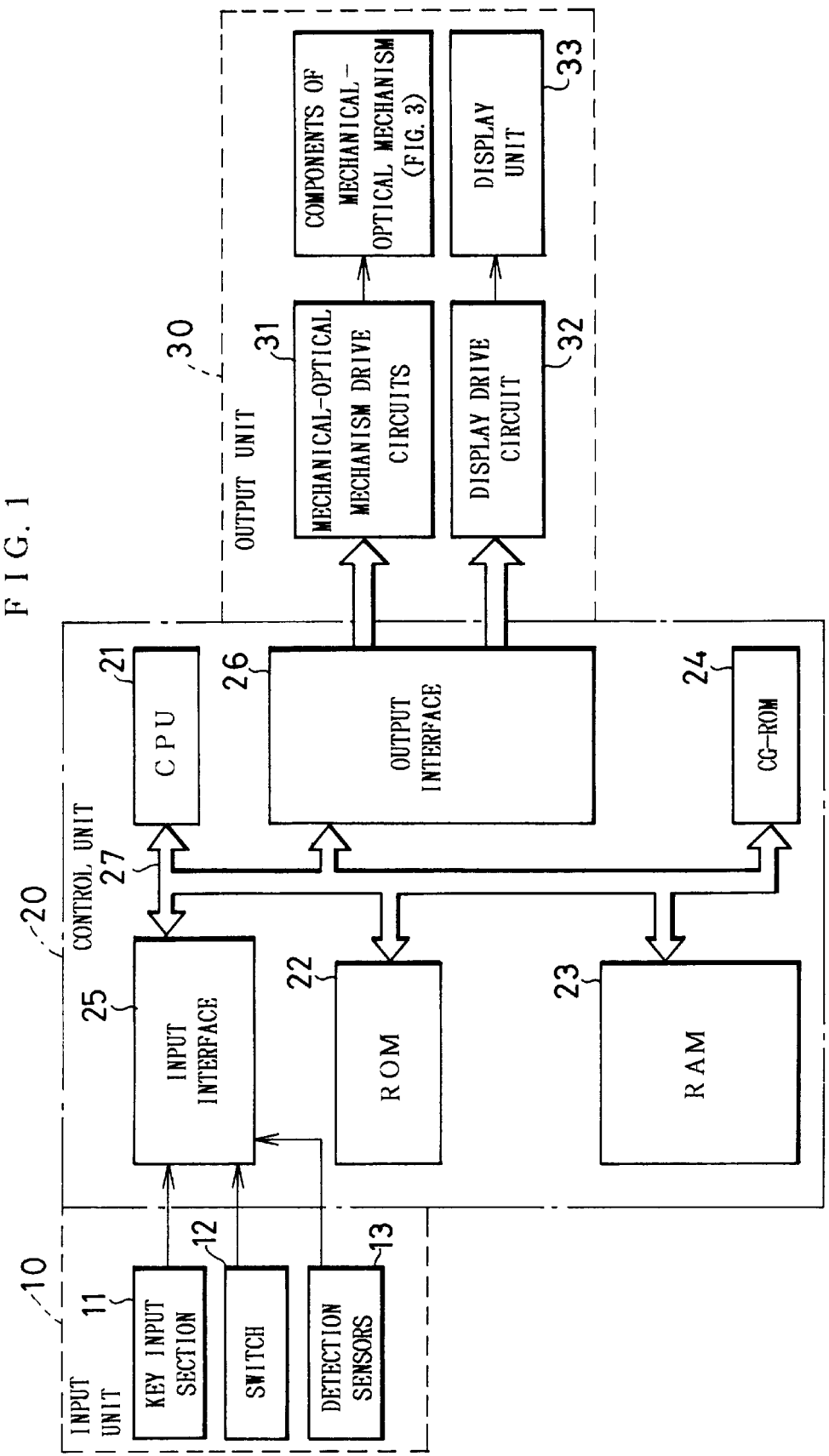
FIG. 1 is a block diagram showing an electrical mechanism in the embodiments according to the first to fifth aspects of the present invention.

Hereinafter, referring to the drawings, an embodiment of a seal producing apparatus to which a character input apparatus according to the present invention is applied.

First, referring to FIGS. 1 to 9, an embodiment of a seal producing apparatus to which the character input apparatus according to the first aspect of the present invention is applied.

Figure 2:
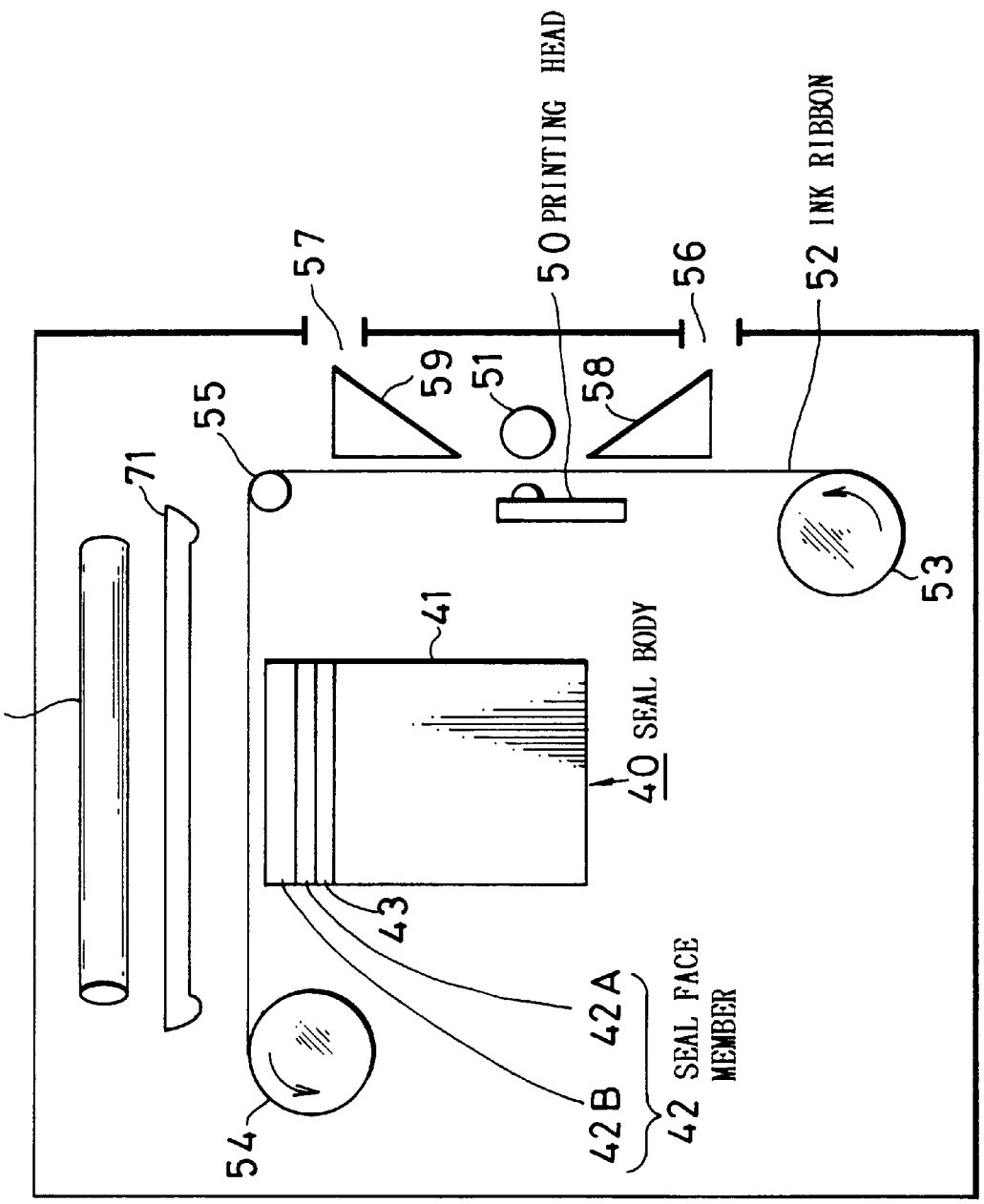
FIG. 2 is a view showing an arrangement of a mechanical-optical mechanism in the embodiments according to the first to fifth aspects of the present invention.
Figure 3:
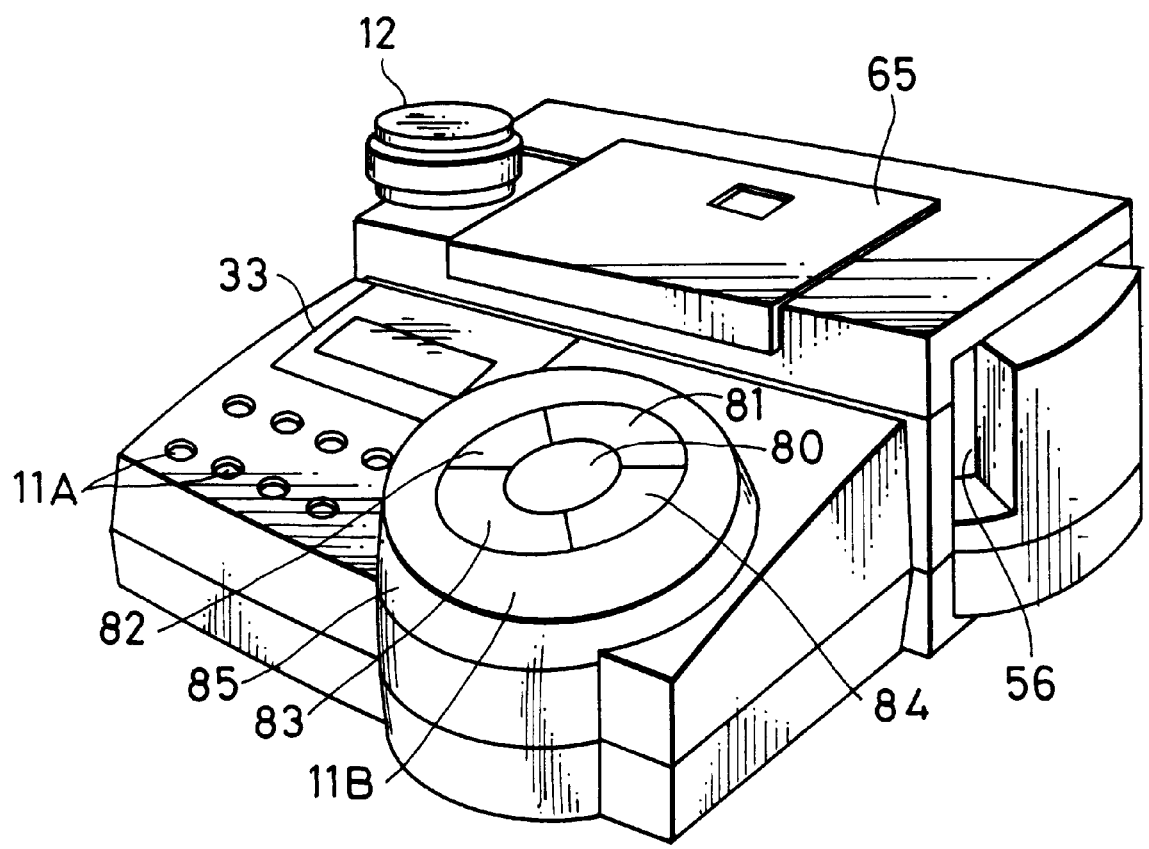
FIG. 3 is a perspective view showing the outer appearance of the embodiments of the first to fifth aspects of the present invention.

The seal producing apparatus of this embodiment, roughly speaking, comprises an electrical mechanism (including an information processing unit and an imprint transfer control unit) shown in FIG. 1, and a mechanical-optical mechanism (including a printing unit and a light irradiation unit) shown in FIG. 2. FIG. 2 also shows the configuration of a seal itself. FIG. 3 is a perspective view of the seal producing apparatus.

Referring to the block diagram in FIG. 1 and the perspective view in FIG. 3, the electrical mechanism in this embodiment will be described.

The electrical mechanism is adapted mainly to introduce imprint pattern information so as to control the mechanical-optical mechanism, and categorized into a type of information processor. The electrical mechanism, roughly speaking, comprises an input unit 10, a control unit 20 and an output unit 30, as in other information processors. The control unit 20 is adapted to execute a processing in accordance with information supplied from the input unit 10 and a processing stage at that point of time, and to control the mechanical-optical mechanism via the output unit 30 based on the results of the processing, etc.

The input unit 10 comprises a key input unit 11, a switch 12 for switching the state of the apparatus, and various types of detection sensors 13.

The switch 12 is constituted by, for example, a dial switch, and is adapted to instruct turning-on and turning-off of the power, starting exposure to the seal (the seal face member) and opening a cover member 65 provided at a space for accommodating the seal. As the detection sensors, a sensor for detecting the type of a seal, a sensor for detecting attachment of an ink ribbon, and a sensor for detecting attachment and position of a plate-making sheet as later described can be mentioned.

The key input unit 11, roughly speaking, comprises a character selection dial section 11B for outputting general operation signals for character input, and a function key section 11A for outputting operation signals associated with functions other than character input and specific operation signals for character input, such as deletion of inputted characters, and input of symbol characters. The function key section 11A has a delete key.

Figure 4:
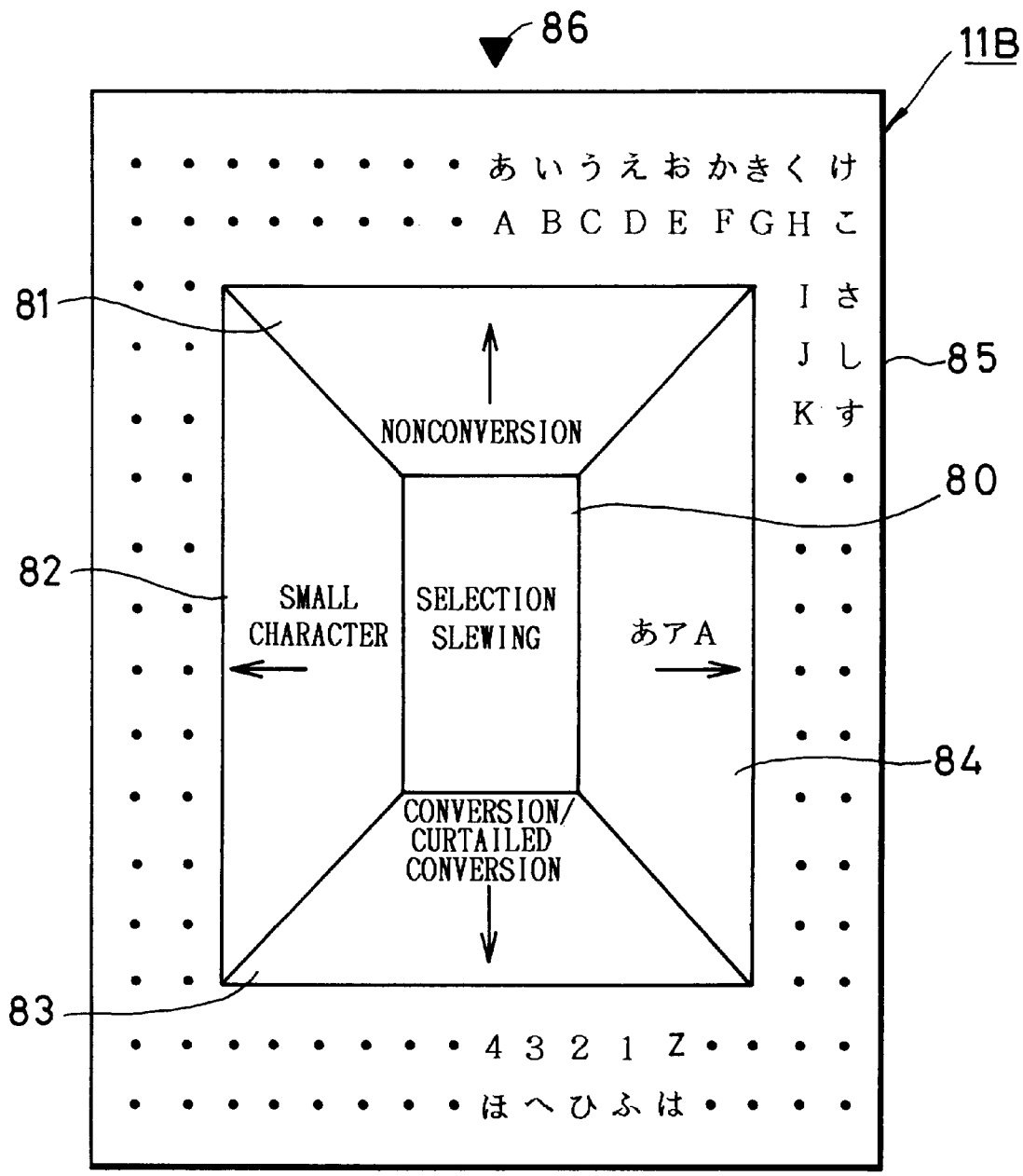
FIG. 4 is a schematic plan view of a character selecting dial section 11B in the embodiments according to the first to fifth aspects of the present invention.

As shown in FIG. 4, the character selection dial section 11B comprises a circular selection slewing key 80 positioned at the center when seen from above, cursor moving keys 81 to 84 formed by dividing the torus-shaped portion surrounding the selection slewing key 80 into four portions, and a character selection dial 85 formed by the torus-shaped portion surrounding the cursor moving keys 81 to 84. FIG. 4 shows allocation of characters and allocation of character input functions in the character selection dial section 11B. In FIG. 4, circular or torus-shaped portions are shown as rectangular portions for convenience of illustration.

The character selection dial 85 is rotatable clockwise and counterclockwise. The dial 85 can be indexed by a unit angle determined by dividing the circumference into, for example, 54 portions. As shown in FIG. 4, in the dial 85, the characters "あいうえお..." are printed along the outer circumference and the characters "ABCDE..." are printed along the inner circumference. The dial 85 is adapted to transmit a signal of a character indicated by the character designation mark 86 to the control unit 20. Note that, with respect to the characters allocated to the same unit angle, for example, "あ" and "A", the character signals are the same. It is judged by the control unit 20 whether the character "あ" or the character "A" is inputted in accordance with the character type signal held in the unit 20 at that time.

The selection slewing key 80 positioned at the center is constituted as a depression key. On the selection slewing key 80, characters "選択" (selection) and "改行" (slewing) are printed. The control unit 20 judges base on the character input state at that time whether the operation signal sent from the selection slewing key 80 instructs selection of the inputted candidate character or slewing. The term "slewing" as used herein refers to an operation or action of making another new line. Accordingly, a slewing action is applied to one line, a the number of lines in total increases by one. For example, the control unit 20 executes a slewing action when the selection slewing key 80 is operated under the state that the cursor is positioned at the line consisting of only determined characters, and otherwise executes a selecting action.

The cursor moving key for moving the cursor upward (hereinafter referred to as "cursor upward moving key") 81 is constituted as a depression key. On the cursor upward moving key 81, characters "↑" and "無変換" (nonconversion) are printed. When the cursor upwardmoving key 81 is operated, the control unit 20 issues a warning under a character input state that neither nonconverting action nor cursor upward moving action can be accepted, executes a nonconverting action under a character input state that the cursor upward moving action cannot be accepted except the above character input state, and executes a cursor upward moving action under the other character input states.

The cursor moving key for moving the cursor leftward (hereinafter referred to as "cursor leftward moving key") 82 is constituted as a depression key. On the cursor leftward moving key 82, characters "←" and "小文字" (small character) are printed. When the cursor leftward moving key 82 is operated, the control unit 20 issues a warning under the character input state that neither action of converting into a small character (including a capital letter restored from a small letter at the time of inputting alphabets) action nor cursor leftward moving action can be accepted, executes an action of converting into a small letter in a character input state that cursor leftward moving action cannot be accepted except the above character input state, and executes an action of moving the cursor leftward in the other character input states.

Further, a cursor moving key for moving the cursor downward (hereinafter referred to as "cursor downward moving key") 83 is constituted as a depression key. On the cursor downward moving key 83, characters "↓" and "変換 読み短縮" (conversion/curtailed conversion) are printed. When the cursor downward moving key 83 is operated, the control unit 20 issues a warning under the character input state that neither a kana-kanji converting action nor a cursor downward moving action can be accepted, executes a kana-kanji converting action under a character input state that cursor downward moving action cannot be accepted except the above character input state, and executes a cursor downward moving action under the other character input states.

Further, a cursor moving key for moving the cursor rightward (hereinafter referred to as "cursor rightward moving key") 84 is constituted as a depression key. On the cursor rightward moving key 84, characters "←" and "あアA" are printed. When the cursor rightward moving key 84 is operated, the control unit 20 issues a warning under the character input state that neither an あアA converting action of converting among a hiragana, a katakana and an alphabet nor a cursor rightward moving action is accepted, executes an アあA converting action under the character input state that the cursor rightward moving action is accepted except the above character input state, and executes a cursor rightward moving action under the other character input states.

The output unit 30 comprises a mechanical-optical mechanism driving circuits 31 for driving and controlling each section of the mechanical-optical mechanism as later described, and a driving circuit 32 for driving the display unit 33. The driving circuits 31 and 32 are adapted to drive their associated units under the control of the control unit 20.

Figure 5:
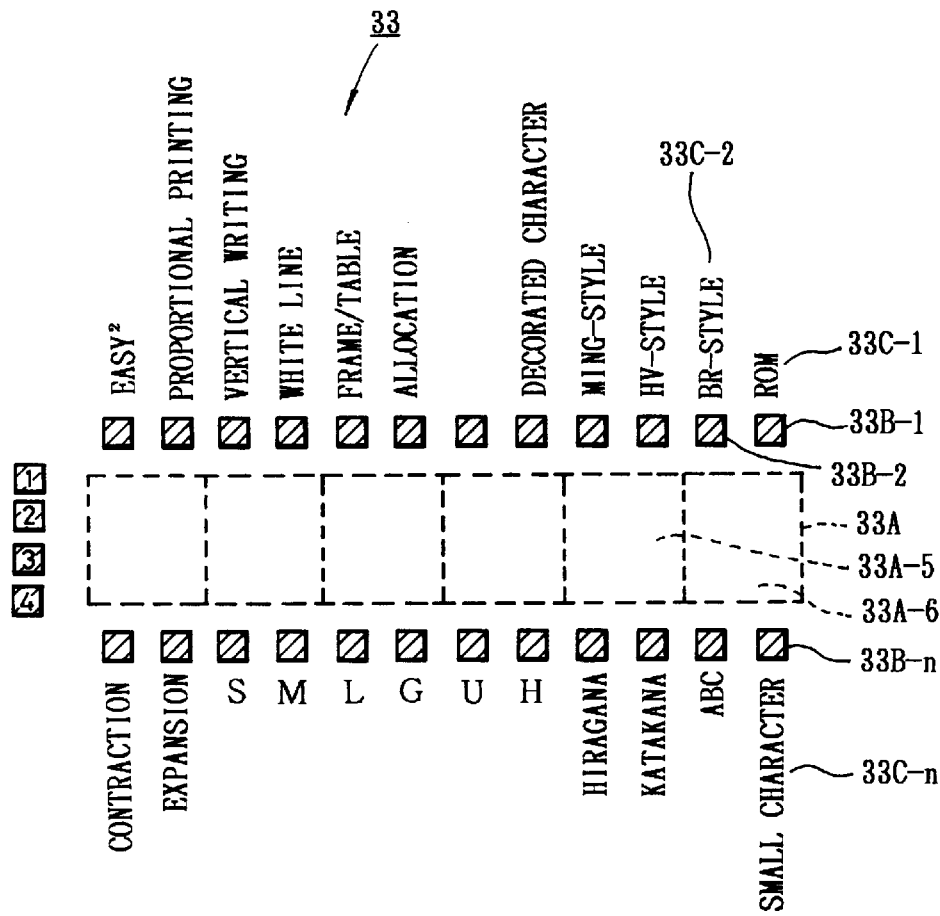
FIG. 5 is a plan view of a display unit 33 in the embodiments according to the first to fifth aspects of the present invention.

The display unit 33, as shown in FIG. 5, comprises a liquid crystal display 33A capable of displaying, for example, six letters, and a plurality of indicators 33B-1 to 33B-n arranged around the liquid crystal display 33A. The liquid crystal display 33A displays a guidance message for the user, and a character string inputted by the user. At the portions on the surface of the apparatus associated with the respective indicators 33B-1, . . . , 33B-n, characters 33C-1, . . . , 33C-n representing the attributes or states allocated to the respective indicators are printed. The current attributes or states are shown by lighting, lighting-off or flashing of the indicators 33B-1, . . . ,33B-n.

This embodiment basically employs a cursor fixed display method wherein the cursor is fixedly displayed at the fifth character display area 33A-5 of the crystal display 33A. Also, the display area for the candidate character indicated by the character selection dial 85 is set on the sixth character display area 33A-6 on the crystal display 33A.

Further, with respect to the manner of displaying characters on the liquid crystal display 33A, a "positive display", a "negative display" and a "flashing display" in which the "positive display" and the "negative display" alternate are mentioned. The "positive display" is a manner of displaying determined characters and semi-determined characters (in the state of semi-determined characters, conversion only between a hiragana and a katakana can be executed). The "negative display" is a manner of displaying characters in the state that the characters are introduced from the character selection dial 85, that is, tentatively determined characters. In the state of tentatively determined characters, the currently displayed hiragana can be converted into a hiragana, a katakana or a kanji. The "flashing display" is a manner of displaying an input candidate character indicated by the character selection dial 85. Incidentally, "hiragana" is one of the character style of the Japanese language.

Hereinafter, the character displayed in the "positive display" (determined characters and tentatively determined characters) are referred to as "positive character", the character displayed in the "negative display" as "negative character", and the character displayed in the "flashing display" (input candidate characters) as "flashing character".

Incidentally, the mechanical-optical mechanism driving circuits 31 actually comprises various driving circuits, but are shown in a block in the drawing. The mechanical-optical mechanism has various components which must be controlled as later described, and actually has their associated driving circuits.

The control unit 20 is constituted by, for example, a microcomputer. The unit 20 comprises a CPU 21, a ROM 22, a RAM 23, a character generator ROM (CG-ROM) 24, an input interface 25 and an output interface 26 that are connected via a system bus 27.

The ROM 22 stores various types of processing programs for producing a seal, including a processing program for character input that is executed by the CPU 21 (see FIG. 8), and fixed data such as dictionary data for kana-kanji conversion.

The RAM 23 is used as a working memory by the CPU 21 and adapted to store fixed data associated with user input. The RAM 23 is backed up even when the power is turned off.

The CG-ROM 24 is adapted to store dot patterns (fonts) of the letters and symbols provided in the seal producing apparatus and to output, when code data for specifying a letter or symbol are supplied, dot patterns corresponding thereto.

The input interface 25 is adapted to interface between the input unit 10 and the control unit 20. The output interface 26 is adapted to interface between the output unit 30 and the control unit 20.

The CPU 21 is adapted to execute a processing program stored in the ROM 22 that is determined in accordance with an input signal sent from the input unit 10 and a processing stage at that time while utilizing the RAM 23 as a working area or, if necessary, appropriately using fixed data stored in the ROM 22 or RAM 23. Also, the CPU 21 is adapted to cause the display unit 33 to display the state or result of the processing, or drives each component of the mechanical-optical mechanism (FIG. 2) so as to produce a seal.

Figure 7:
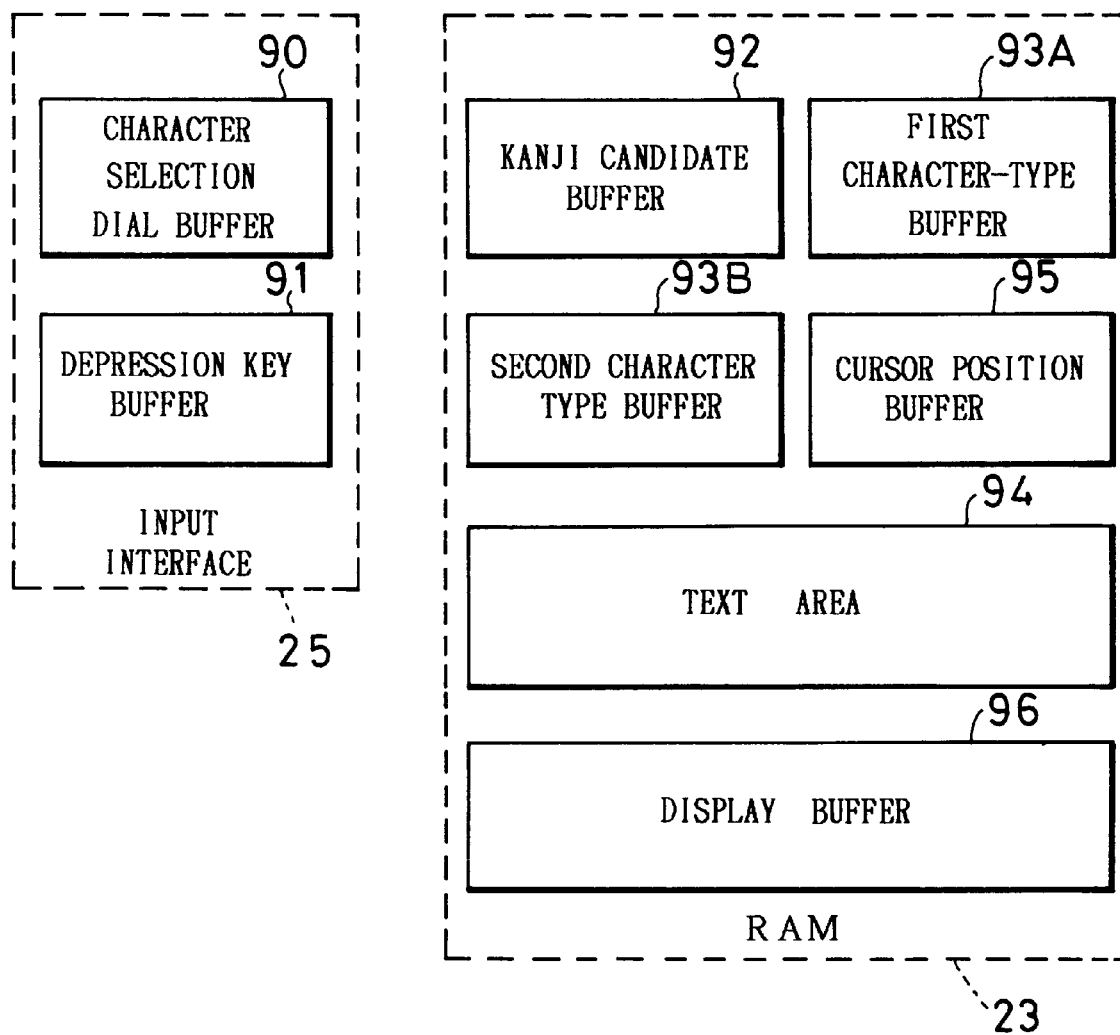
FIG. 7 is a view showing a configuration of buffers and other components of RAM 23 in the embodiment of the first aspect of the invention at the time of character input.

FIG. 7 shows buffers provided in the input interface 25, and various buffers provided in the RAM 23 and adapted to input characters, and other components. Note that the configuration of the buffers for character input is optional and therefore is not limited to this embodiment.

The input interface 25 comprises a character selection dial buffer 90 for buffering a character signal sent from the character selection dial 85, and a depression key buffer 91 for buffering operation signals sent from the operation keys 80 to 85. The RAM 23 comprises: a kanji candidate buffer 92 for buffering a kanji candidate at the time of kana-kanji conversion; a first character-type buffer for buffering information representing the type of character, i.e., "hiragana", "katakana" or "alphabet" taken when the character signal buffered in the character selection dial buffer 90 is introduced; a second character-type buffer 93B for buffering information representing the type of character, i.e., capital letter or small letter taken when the character information buffered in the character selection dial buffer 90 is introduced; a text area 94 for storing the inputted character string together with information representing states of the respective characters of the character string, i.e., information representing a determined character, a tentatively determined character or an undetermined character; a cursor position buffer 95 for buffering information of the position of the cursor; and a display buffer 96 for buffering the contents to be displayed on the display 33A. Incidentally, "katakana" is one of the types of characters used in Japanese language.

The display buffer 96 is divided into areas corresponding to the first to sixth character display areas 33A-1 to 33A-6 of the liquid crystal display 33A. To each area of the buffer 96, information as to how a developed dot pattern is outputted is added. More specifically, the added information shows either the way the developed dot pattern is displayed as it is on the liquid crystal display 33A (corresponding to the positive display), or the way the developed dot pattern is displayed in a reversed manner on the liquid crystal display 33A (corresponding to the negative display), or the way of switching between the way the developed dot pattern is displayed as it is and the way the developed dot pattern is displayed in a reversed manner on the liquid crystal display 33A at a predetermined cycle (corresponding to a flashing display).

Next, the configurations of the mechanical-optical mechanism and the seal will be described with reference to FIG. 2.

The seal 40 comprises a base member 41, a sponge member 43 for enhancing contact between of the projected portions of the seal face member and a sheet, and a planar seal face member 42. The seal face member comprises a base layer 42A insensitive to ultraviolet light, and an ultraviolet-cured-resin layer 42B exposing to the outside. In the ultraviolet-cured-resin layer 42B, portions other than the cured portion can be removed with a specific liquid.

The mechanical-optical mechanism shown in FIG. 2, roughly speaking, comprises a printing structure and an ultraviolet irradiation structure.

The printing structure employs a thermal transfer method and comprises a printing head 50 of a fixed type, a platen roller 51, an ink ribbon 52, a feeding reel 53, a winding reel 54, a roller 55 for switching the proceeding direction of the ink ribbon 52. The printing structure further comprises an insertion hole 56 for inserting a plate-making sheet (see FIGS. 6A and 6B), a discharging hole 57 for discharging the plate-making sheet, a guide member (including a detection sensor for detecting attachment and position of the plate-making sheet) 58 for guiding the plate-making sheet inserted from the insertion hole 56 to a printing position, and a separation structure 59 for separating the plate-making sheet from the ink ribbon 52, both fed from the printing position, so as to guide the plate-making sheet thus separated to the discharging hole 57.

Figure 6A:
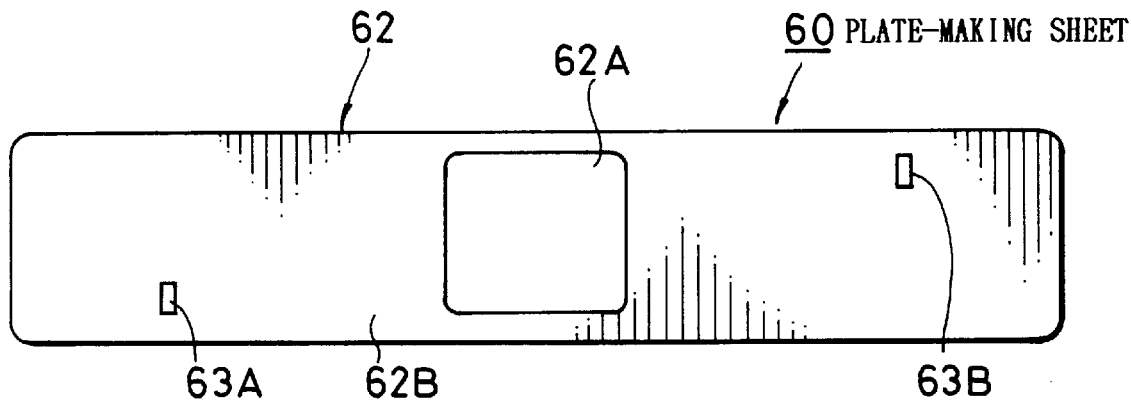
FIGS. 6A and 6B are views illustrating a plate-making sheet 60 in the embodiments according to the first to fifth aspects of the present invention.
Figure 6B:
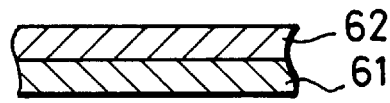

As shown in FIGS. 6A and 6B illustrating a plate-making sheet 60 used for a rectangular seal, the plate-making sheet 60 comprises a sheet body 62 having a rear surface coated with an adhesive agent, and a peelable paper 61 adhered on the rear surface of the sheet body 62. The plate-making sheet 60 has the same size irrespective of types of the seal. The sheet 60 has holes 63A and 63B provided symmetrically with respect to the center of the sheet and adapted to indicate a print starting position. The sheet body 62 is divided into a portion 62A having the same shape as the contour of the seal face member 42, which depends on the type of the seal, and a portion 62B other than the portion 62A. Portions 62A and 62B can be separated from each other by half cut, whereby only the portion 62A can be peeled separately. The term "half cut" as used herein refers to the state of the sheet in which only the sheet body 62 is formed with a slit dividing the portions 63A and 63B while the peelable portion61 is continuous, that is, not formed with such a slit. When the plate-making sheet 60 is inserted into the insertion hole 56, the edge portion of the plate-making sheet 60 and the ink ribbon 52 are superposed and placed at the printing position between the printing head 50 and the platen roller 51.

The printing head 50 is adapted to transfer ink of the ink ribbon to the plate-making sheet 60 by generating heat when the heat generation driving circuit (see reference numeral 31 in FIG. 1) is activated under the control unit 20. In the ink ribbon 52 of a thermal transfer method, the transferred portion loses ink and becomes transparent. That is, the ink ribbon 52 obtained after transferring operation comprises a portion which allows ultraviolet light to pass through (a portion from which ink is removed) and a portion which hinders ultraviolet light from passing through (a portion where ink remains). Accordingly, the ink ribbon obtained after the transferring operation, namely, the ink ribbon in which printing of an imprint pattern and consequently transparent portions corresponding to the imprint pattern is formed, is used as a negative film.

In the plate making process, the ink ribbon 52 and the plate-making sheet superposed each other after passing the printing section consisting of the printing head 50 and a platen roller 51 are conveyed by the action of the platen roller 51 (or a driving roller not shown) to reach the separation structure 59, by which the ink ribbon 52 and the plate-making sheet 60 are separated.

The separated plate-making sheet 60 is fed to the discharging hole 57. On the other hand, the separated ink ribbon 52 is adapted to stop at the position opposite to the ultraviolet cured resin layer 42B of the seal 40. The ink ribbon 52 thus fed during the plate-making operation is adapted to be wound around the winding reel 54.

After the plate-making sheet 60 is discharged from the discharging hole 57, the printed portion 62A thereof is peeled off and attached on the top surface of the seal 40 to help the user recognize the imprint pattern formed on the seal face member of the seal 40.

As the ultraviolet light irradiating structure, an ultraviolet irradiation light source (having, for example, a paraboloidal mirror surface) 70 is fixedly provided. Turning on and off of the light source 70 is controlled by the control unit 20. Also, a transparent plate 71, which is moved forward and backward by a forward-backward moving structure (not shown), is provided opposite to the ultraviolet-cured-resin layer 42B of the seal face member 42 with the ink ribbon 52 positioned therebetween. That is, ultraviolet light emitted from the ultraviolet irradiation light source 70 reaches the ultraviolet-cured-resin layer 42B via the transparent plate 71 and the ink ribbon (negative film) 52. The transparent plate 71 is adapted to enhance the degree of contact between the ink ribbon52 serving as a negative film and the ultraviolet-cured-resin layer 42B when situated at a forward movement position (a position taken when the switch 12 designates activation of exposure), and not to obstacle the proceeding of the ink ribbon 52 when situated at the backward position.

The front and rear edges (with respect to the proceeding direction of the ink ribbon 52) of the transparent plate 71 are, for example, rounded so as not to damage the ink ribbon 52 when the plate 71 comes in contact with the ribbon 52. Further, the front and rear edges of the plate 71 thus rounded is slightly projected with respect to the surface of the other portion thereof. The projected edges are adapted to enhance the degree of contact between the ink ribbon 52 and the seal face member 42 by elevating the tension of the ink ribbon 52 when the transparent plate 71 proceeds forward to bring the ribbon 52 into contact with the seal face member 42.

Next, a general procedure which is executed by the user for producing a seal with the seal producing apparatus of this embodiment will be described.

The user turns on the power by operating the switch 12, and then inputs imprint pattern information (a character string) by operating keys of the key input unit 11. Input of the imprint pattern information includes input of various attributes of the characters, such as styles of the characters, vertical writing or lateral writing, and character sizes, as well as input of the character string constituting the imprint image.

After completing the input of imprint pattern information, the user usually executes layout display by operating the layout display key in the key input unit 11 to verify whether or not the imprint image is desired. After verifying the imprint image is properly set, the user inserts the plate-making sheet 60 into the insertion hole 56 as far as the sheet 60 proceeds. Thereafter, the user executes a plate-making processing by operating a plate-making key in the key input unit 11, thereby endowing the ink ribbon 52 with a function of a negative film. When the plate-making key is operated, the CPU 21 develops the inputted character string on the printing buffer in the RAM 23 in accordance with attributes associated with the character string. Thereafter, the CPU 21 drives the printing head 50 and the platen roller 51 to execute printing so as to prepare a negative film, which is conveyed to the position opposite to the seal face member 42.

After completing the plate-making process, the user instructs exposure by operating the switch 12. The CPU 21 activates the ultraviolet irradiation light source 70 to irradiate ultraviolet light onto the seal face member 42. After elapse of a predetermined irradiation time determined in accordance with the type of the attached seal 40, an exposure completion message is displayed and concurrently irradiation of the ultraviolet light emitted from the ultraviolet light irradiating source 70 is ceased. With this process, in the ultraviolet cured resin layer 42B of the seal face member 42, the portions corresponding to the imprint pattern are cured.

After completing exposure, the user operates the switch 12 to open the cover member 65 and takes out the seal 40 obtained after exposure. Thereafter, the user soaks the seal face member 42 of the seal 40 in a specific liquid put in a vessel. Then, the user moves the seal 40 reciprocatingly to wash the seal face member 42 so as to remove the portion not cured, thereby forming unevenness on the seal face member 42. Thus, the seal is produced.

The first aspect of the invention has characteristics in the processing executed when the selection slewing key 80 or the character selection dial 85 in the character selection dial section 11B is operated.

First, referring to FIG. 8(*a*), the processing executed by CPU 21 when the character selecting dial 85 is operated will be described.

The character selecting dial 85 outputs a character signal every time the dial 85 is rotated by a unit angle. Also, the dial 85 outputs a pulse signal to be latched in the character selection dial buffer 90, and causes the character selection dial buffer 90 to buffer the character signal of the character indicated by a character designation mark 86. At this occasion, CPU 21 begins to execute the processing program shown in FIG. 8(*a*).

First, the CPU 212 judges on the basis of the content (display mode information) stored in the display buffer 96 whether or not the sixth display area 33A-6 of the liquid crystal display 33A has been executing flashing display (step 100). In other words, the CPU 21 judges whether or not an action of displaying the character designated by the character selection dial 85 as an input candidate character has already begun.

When a negative result is obtained at step 100, the CPU 21 operates a part of the display buffer 96 to extinguish the cursor having been displayed so far at the fifth display area 33A-5 of the crystal display 33A (step 101). At this occasion, the cursor position buffer 95 is not updated, either.

When a positive result is obtained at step 100, or, when the processing at step 101 is completed, a dot pattern determined by a character signal buffered in the character selection buffer 90 and character type signals buffered in the first and second character-type buffers 93A and 93B are read out of CG-ROM 24 to develop the read-out data in the sixth area of the display buffer 96. Also, flashing display information is maintained, and the character designated by the character selection dial 85 at that time is displayed in a flashing manner at the sixth character display area 33A-6 of the liquid crystal display 33A (step 102).

The action shown in FIG. 8(*a*) described above is executed repeatedly every time the character selection dial 85 is rotated by a unit angle.

Thus, when the sixth character display area 33A-6 of the liquid crystal display 33A is switched into a flashing display state, the cursor is not displayed. This is because the character displayed in a flashing manner is the object character to be processed at that time, and because if the cursor is remained and displayed at the fifth display area 33A-5, the user cannot understand the significance of the displayed cursor, which causes a confusion instead.

As shown in FIG. 8(a), when the character selection dial 85 is rotated under the state that character displayed in a flashing manner (input candidate character) is not present, action of shifting the displayed character string is not executed.

Next, referring to FIG. 8(b), the processing of CPU 21 executed when the selection slewing key 80 is operated.

When the selection slewing key 80 is operated, the operation signal is buffered in the depression key buffer 91. At this occasion, CPU21 judges which depression key of the keys 80 to 84 in the character selection dial section 11B is operated based on the operation signal in the buffer 91. When it is judged that the selection slewing key 80 is operated, processing based on the processing program shown in FIG. 8(b) is executed.

The CPU 21 judges based on the content (display mode information) stored in the display buffer 96 whether or not flashing display has been executed at the sixth character display area 33-A of the liquid crystal display 33A (step 200). In other words, the CPU 21 judges whether or not the action of displaying the character designated by the character selection dial 85 as an input candidate character has already started.

When a positive result is obtained at step 200, the CPU 21 stores the information of a character determined by a character signal buffered in the character selection dial buffer 90 and a character type signal buffered in the first and second character type buffers 93A and 93B at a position next to the position indicated by the cursor position information in the cursor position buffer 95 of the text area 94 (step 201). At this occasion, when the character information is as to a hiragana, information representing that the character is a tentatively determined character is stored in the text area 94. Also, when the character information is as to a katakana or an alphabet, information representing that the character is a determined character is stored in the text area 94.

Thereafter, the CPU 21 updates the cursor position information from one indicating the position so far to one indicating the next position, executes updating the display buffer 96 based on the updated cursor position information and the updated content stored in the text area 94, and switches the display in which displayed character string is shifted leftward by one display area (step 202). At the fifth character display area 33A-5 of the liquid crystal display 33A, a cursor is displayed by executing development of adding a cursor to the display buffer 96 (step 203). Further, at the sixth character information display area 33A-6 of the liquid crystal display 33A, a blank (background) is displayed by executing processing of extinguishing the dot pattern at the corresponding area in the display buffer 96 (step 204). At step 204, when the selection of the character indicated by the character selection dial 85 is performed in the middle of the already existing character string, the character located immediately behind the inserted character is displayed at the sixth character display area 33A-6 instead of a blank. Note that the steps 202 to 204 may be processed in an order other than the order described above. Further, in the above description, the cursor is displayed in a lighted manner, but the cursor may be displayed in a flashing manner.

When a negative result is obtained as a result of the judgment at the step 205, the CPU 21 executes another selection action or slewing action.

As described above, when an operation of selecting an input candidate character designated by the character selection dial 85 performed, action of shifting a displayed character string is executed.

Next, referring to FIG. 8(c), the processing of the CPU 21 executed when the delete key in the function key section 11A is operated will be described.

When the delete key is operated, the operation signal is buffered in a function key buffer (not shown) provided in the input interface 25. At this occasion, the CPU 21 judges based on the operation signal in the buffer which depression key in the function key section 11A is operated. At this occasion, when it is judged that the delete key is operated, the processing proceeds to the processing program shown in FIG. 8(c).

The CPU 21 first judges based on the content (display manner information) stored in the display buffer 96 whether a flashing display action has been executed at the sixth character display area 33A-6 of the liquid crystal display 33A (step 300). In other words, it is judged whether or not the action of displaying the character designated by the character selection dial 85 as an input candidate character has already begun.

When a positive result is obtained at step 300, the CPU 21 erases the dot pattern at the sixth area of the display buffer 96 so as to display a blank (background) at the sixth character display area 33A-6 of the liquid crystal display 33A, and restore the cursor at the fifth character display area 33A-5 (step 301). When selection of the character designated by the character selection dial 85 is executed in the middle of the already existing character string, in the processing at step 301, the character before inserting action is displayed instead of a blank at the sixth character display area 33A-6. When a negative result is obtained at step 300, another deletion processing is executed (step 302).

Thus, in this embodiment, even when the character displayed in a flashing manner (input candidate character) is deleted, the displayed character string is not shifted. Incidentally, in the conventional art, when the inputted candidate character is deleted, shifting action was performed in order to restore the previous display state. The shifting action performed at the time of deleting the inputted candidate character was necessary because the position for fixedly displaying the cursor and the position for displaying the inputted candidate character are located at the same position. Therefore, in this embodiment, switching the display mode at the time of deleting an inputted candidate character can be executed more rapidly than the conventional art because the shifting action is not executed.

FIG. 9 is a view showing an example of changes in the displayed content in accordance with the operations performed in this embodiment. In FIG. 9, the framed numeric character shows the line number in which the character is located and the forefront of the line.

Assume that a character "ほ" is displayed at the sixth character display area 33A-6 of the liquid display 33A in a flashing manner, as shown in FIG. 9(a). Under this state, when the selection and slewing key 80 is operated, the CPU 21 judges that selection of this input candidate character is instructed because the flashing character (input candidate character) is present. Thereafter, as shown in FIG. 9(b), the character string including the character is shifted leftward and displayed, and concurrently the cursor is displayed as well in the fifth display area, and the sixth display area is made to be a blank. Incidentally, since the input candidate character is "hiragana", the character "ほ" is displayed as a tentatively determined character.

Under the state shown in FIG. 9(b), assume that the character selection dial 85 is rotated clockwise by one unit angle. Since the character selection dial 85 is operated in the state that no flashing character is displayed, the CPU 21 erases the cursor at the fifth character display area as shown in FIG. 9(*c*), and the character "$" designated by the character selection dial 85 at the sixth character display area.

Under the state as shown in FIG. 9(*c*), when the delete key is operated, the CPU 21 judges that an instruction for deleting the input candidate character is issued because the deleting instruction is issued under the state that the flashing character (input candidate character) is present, and deletes the character "$" displayed at the sixth character display area and restore the cursor at the fifth character display area, as shown in FIG. 9(*d*).

As described above, according to this embodiment, when the input candidate character designated by the character selection dial 85 is selected, display in a flashing manner is erased and the character string including the selected character is shifted and displayed, the user can confirm that the acceptance of the selecting operation is accepted. In this respect, the operability of the apparatus is enhanced compared with conventional ones.

Note that the apparatus to which the character input apparatus according to the first aspect of the invention is applied is not limited to the seal producing apparatus, but applicable to other apparatuses having a character selection dial.

Further, the character selecting means which outputs an input character by means of the shifting action of a mechanical member is not limited to a dial-type as in this embodiment. Alternatively, the character selecting means may be configured such that input candidate characters are sequentially outputted by sliding a button along a straight line.

As described above, the character input apparatus of the first aspect of the present invention comprises:

character selecting means for outputting a signal corresponding to a desired character among a plurality of candidate characters arranged in a prescribed order;

selection determining means for determining selection of a character associated with the signal outputted from the character selecting means;

display means for displaying an inputted character string; and display control means for exercising control of display such that a candidate character is displayed at a prescribed display area of display means in response to the signal sent from the character selecting means, and that the respective characters having been displayed in the display areas are shifted and displayed when selection of a character out of the candidate characters is determined by the selection determining means.

In this apparatus, when selection of candidate character is determined by the selection determining means, each character displayed in the display area is shifted, so that the user can confirm that the selecting operation is accepted.

Next, referring to FIGS. 1 to 6, FIG. 11 and FIG. 12, an embodiment of a seal producing apparatus to which the character input apparatus according to the second and third aspects of the present invention is applied will be described.

In the following description of the embodiment according to the second and third aspects of the present invention, detailed descriptions are given to the features different from those of the embodiment according to the first aspect of the present invention. With respect to features to which detailed description is not given, the explanations given to the embodiment of the first aspect of the present invention are applied appropriately. The same members as in the embodiment of the first aspect of the present invention are denoted by the same reference numerals.

The seal producing apparatus according to the embodiment of the second and third aspects of the present invention, roughly speaking, comprises an electrical mechanism (including information processing unit and imprint transfer control unit) as shown in FIG. 1, and a mechanical-optical mechanism (including a printing unit and a light irradiation unit) as shown in FIG. 2. The configurations of the outer appearance, the character selection dial section 11B, the display unit 31, and the plate-making sheet 60 are the same as in the embodiment of the first aspect of the present invention, as shown in FIGS. 3, 4, 5 and 6, respectively.

Also, the procedure performed by the user for producing a seal with the seal producing apparatus according to the embodiment of the second and third aspects of the present invention is generally the same as in the embodiment of the first aspect of the present invention.

The embodiment according to the second and third aspects of the present invention is characterized in that the processing executed when the depression keys 80 to 85 (in particular, the keys 81 to 84) provided in the character selection dial section 11B are depressed in inputting action is different from that of the embodiment according to the first aspect of the present invention.

Hereinafter, the processing executed by the CPU 21 at this occasion will be described with reference to FIG. 11.

When any one of the depression keys 80, . . . , 85 in the character selection dial section 11B is depressed, the operation signal of the depressed key is buffered in the depression key buffer 91, and sent to the CPU 21 via the input interface 25.

Figure 11:
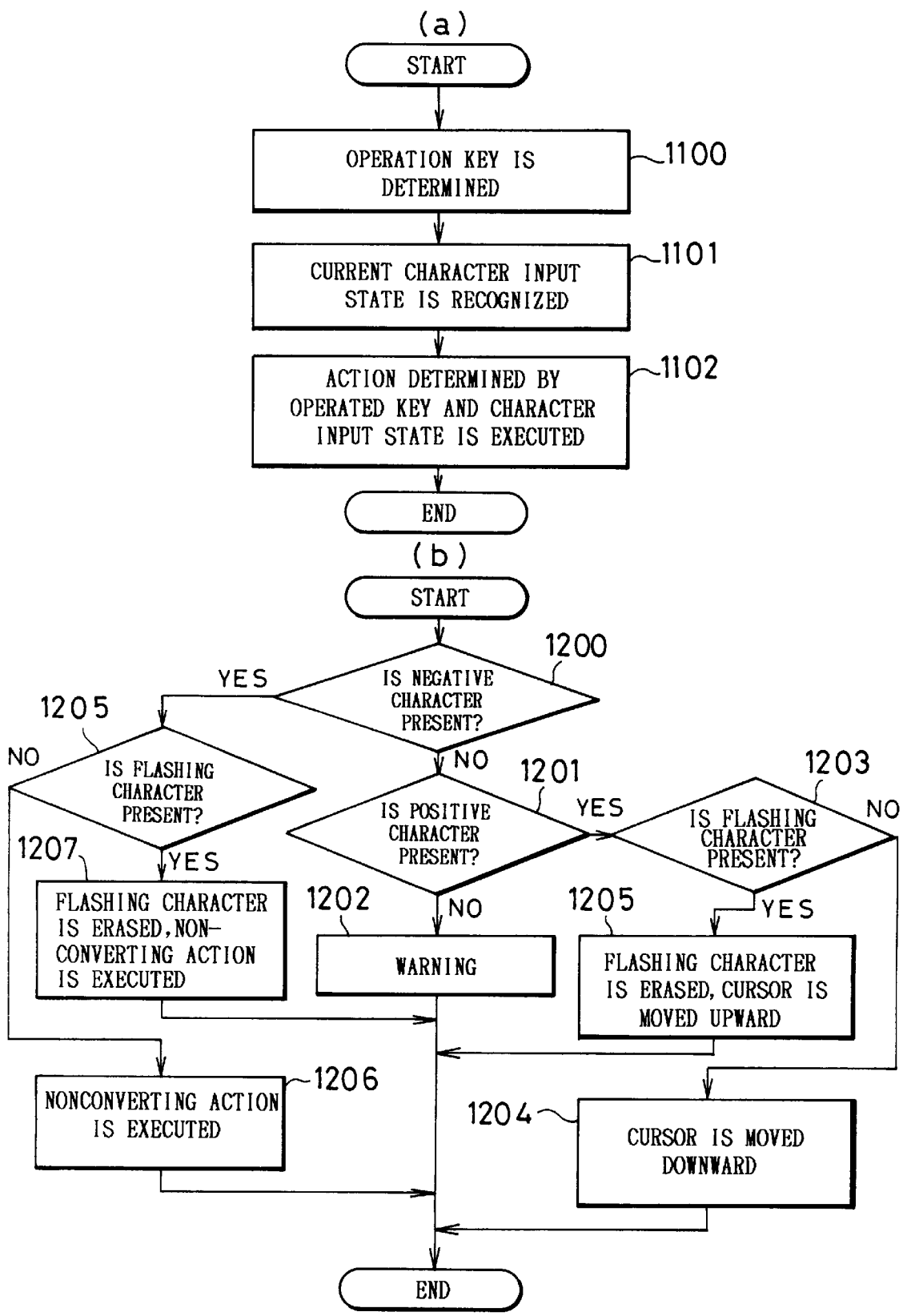
FIG. 11 is a flowchart of a processing executed when a cursor moving key is operated in the embodiment according to the second and third aspects of the present invention.

On receiving the operation signal, the CPU 21 begins to execute the processing shown in FIG. 11(*a*). The CPU 21 first judges which depression key is operated (step 1100), recognizes the current character input state based on the content stored at the text area 94 in the RAM 23, etc. (step 1101). Thereafter, the CPU 21 executes an action determined by the key thus judged and the character input state thus recognized (step 1102).

In the conventional art, the cursor moving key was not allocated another function than a cursor moving function because the cursor moving key is frequently used when character is inputted. In contrast, this embodiment is configurated such that when the cursor moving key is operated, a "cursor moving action" or "another action" is executed in accordance with a character input state. This configuration is adopted considering the fact that, under the state that a relative movement of the cursor with respect to the character is instructed by operating the cursor moving key, there are some cases in which the input is not accepted depending on character input states.

FIG. 11(*b*) is a flowchart of the detailed processing at steps 1101 and 1102 executed when it is judged at step 1100 that the cursor upward moving key 85 is operated.

The CPU 21 judges whether a negative character is present in the text area 94 (step 1200). The negative character is a tentatively determined character as described above. In this embodiment, only hiraganas can be negative characters. The negative character can be converted into a semi-determined character in accordance with an instruction of nonconversion, and can be converted into an object of kanji-conversion when an instruction of conversion is issued.

When the negative character is not present, the CPU 21 judges whether or not a positive character is present in the text area 94 (step 1201). The positive character is a determined character or a semi-determined character, as described above. The determined character is a character which is no longer subjected to further conversion. The semi-determined character is a character in the state that conversion between a "hiragana" and a "katakana" can be performed in accordance with an instruction of nonconversion. Note that even when the displayed character is a "hiragana" or a "katakana", if the character is already a determined character, the character is no longer subjected to further conversion.

When it is judged that neither a negative character nor a positive character is present, since the cursor upward moving key 51 is operated under the character input state that neither action of moving the cursor upward nor nonconversion can be accepted, the CPU 21 issues a warning informing that the operation cannot be accepted irrespective of the presence or absence of a flashing character (step 1202), and restores the state before the operation is performed. At this occasion, the depression key buffer 91 is cleared.

On the other hand, when a negative character is absent and a positive character is present, the CPU 21 judges whether or not a flashing character is present in the text area 94 (step 1203). When the flashing character is absent in the text area 94, the CPU 21 immediately executes an action of moving the cursor upward (since the cursor fixedly displayed method is employed, the displayed line is changed from the currently displayed to the line located by one line above the currently displayed line) (step 1204). When a flashing character is present in the text area 94, an action of moving the cursor upward accompanied by erasure of the flashing character is executed (step 1205), and the processing associated with the operation is completed. At this occasion, the depression key buffer 91 is cleared.

Incidentally, the flashing character is a character designated by the character selection dial 85, as described above, and it is not clear whether or not the flashing character will be inputted. Therefore, the flashing character is made to be erased at step 1205.

When the above-described action of moving the cursor upward is executed, the content of the cursor position buffer 95 is updated, and the display buffer 96 is also updated. Further, if erasure of the flashing character takes place, the text area 94 is also updated. When a positive character of semi-determined character is present, the semi-determined character is updated to a determined character in the text area 94 when the cursor upward moving action is executed.

Note that the cursor upward moving action executed at the first line where the semi-determined character is situated may be replaced by a converting action between "hiragana" and "katakana".

When a negative character is present, the CPU 21 judges whether or not a flashing character is present in the text area 94 (step 1205). When the flashing character is not present in the text area 94, the CPU 21 immediately executes a noncoverting action (step 1206). When a flashing character is present in the text area 94, nonconverting action accompanied by erasure of the flashing character is executed (step 1207), and then the processing associated with the operation is finished. At this occasion, the depression key buffer 91 is cleared.

The nonconverting action is an action of converting a negative character into a positive character. The positive character in this case is a semi-determined character. When the noncoverting action is executed, the text area 94 and the display buffer 96 are updated.

When the other depression keys 80, 82, 83 and 84 are operated, as described above, the CPU 21 executes an action determined by the operated key and the character input state. FIG. 10 is a table illustrating a relationship among operated keys, character input states, and actions. In the following description, explanation as to the actions executed when the selection key is operated is omitted.

When the cursor downward moving key 81 is operated, while detailed description is omitted, the CPU 21 issues a warning under the state that neither a kana-kanji converting action nor a cursor downward moving action can be accepted, executes a kana-kanji converting action under the character input state that cursor downward moving action cannot be accepted except the above character input state, and executes a cursor downward moving action under executed in the other character input states. Incidentally, when the kana-kanji converting action is executed, kanji candidate is stored in the kanji candidate buffer 92, and the kanji candidates in the kanji candidate buffer 92 is displayed in the display buffer 96, an instruction of selection to be issued by the user is awaited.

When the cursor leftward moving key 82 is operated, while detailed description is omitted, the CPU 21 issues a warning under the state that neither the action of converting to a small letter (including restoration to a capital letter when alphabets are inputted) nor cursor leftward moving action can be accepted, executes an action of converting into a small letter under a character input state that cursor leftward action cannot be accepted except the above character input state, and executes a cursor leftward moving action under the other character input states. Incidentally, in the small-letter converting action executed when a "hiragana" or a "katakana" is inputted (which type of character is inputted is known from the first character-type buffer 93A), only the character at which the cursor is situated is converted into a small letter. In contrast, in the action of converting into a small letter executed when alphabets are inputted (this is known from the first character-type buffer 93A), the content of the second character type buffer 93B is reversed between a "small letter" and a "capital letter", and the reversed content is applied to the following character inputs.

Further, when the cursor rightward moving key 84 is operated, while detailed description is omitted, the CPU 21 issues a warning under the state that neither あア A converting action executed for switching among a hiragana, a katakana and an alphabet nor a cursor rightward moving action can be accepted, executes an あア A converting action under the character input state that the cursor rightward moving action cannot be accepted except the above character input state, and executes a cursor rightward moving action under the other character input states. In the あア A converting action, the content of the first character type buffer 93A is switched among a "hiragana", a "katakana" and an "alphabet" in a circulating manner every time an operation is performed.

FIG. 12 shows an example of changes in operation and content displayed on the liquid crystal display 33A.

Assume that as shown in FIG. 12(*a*) the characters "あいういう" are displayed in negative characters and that the cursor left ward moving key 82 is operated twice. In this case, only the negative characters are present, the CPU 21 accepts the operation signal as an instruction for a cursor leftward moving action, and executes the action of moving the cursor leftward. Accordingly, contents displayed become those as shown in FIG. 12(*b*).

The symbol consisting of the framed numeric character (line head mark) in FIG. 12 shows a current line number and the forefront end of the character string. The framed numeric character of a white letter with black background shows that a determined character or a semi-determined character (positive character) is present in the line.

Assume that the cursor upward moving key 81 is operated once under the state shown in FIG. 12(*b*). In this state, since only the negative character is present, the CPU 21 accepts the operation signal as an instruction for nonconverting action, and turns the negative characters located leftward with respect to the cursor (inclusive of the cursor position) into a positive character. Also, the head mark is turned into a framed numeric character of a white letter with black background.

Assume that the cursor rightward moving key 84 is operated twice under the state shown in FIG. 12(*c*). Since both negative and positive characters are present and flashing character is absent, the CPU 21 accepts the operation signal as an instruction for a cursor rightward moving action, and executes a leftward moving action. Accordingly, the displayed contents are turned into that as shown in FIG. 12(*d*).

In the embodiment according to the second and third aspects of the present invention, since the operation of the cursor moving key performed under the character input state that cursor moving actions cannot be accepted is accepted as an instruction for another action associated with character input and each of the cursor moving keys is allocated two functions (one of them is a cursor moving function). With this configuration, the number of keys provided can be reduced, and the area necessary for the key input unit can be reduced. Incidentally, to enjoy these advantages of this embodiment, there is no need to operate another key simultaneously with or before the operation of the cursor moving key for distinguishing the two functions allocated to the cursor moving key.

In this embodiment, the configuration is adopted in which the four types of cursor keys 81 to 84 are provided inside of the torus-shaped character selection dial 85. This configuration reduces the area necessary for the key input unit.

In this embodiment, as shown in FIG. 10, actions are allocated uniformly to the four cursor moving keys, and therefore the keys are well balanced in the number of operations. With this configuration, the life of the apparatus is elongated. More specifically, in the case of the seal apparatus, the number of lines to be inputted is small, and therefore with respect to the cursor moving action, frequency of upward and downward movements is lower than that of leftward and rightward movements. Also, frequency of conversion between the character types (between a capital letter and a small letter; and among あア A is lower than that of nonconverting actions. Accordingly, the cursor moving keys can be well balanced in the number of operations.

Note that the character input apparatus of the present invention is not limited to the seal producing apparatus as described above but can be applied to any other apparatus having a cursor moving key. Further, while the second and third aspects of the present invention is preferably applied to an apparatus whose input panel is small, the apparatus of the present invention can be also applied to apparatuses which have a separate keyboard, such as a personal computer, and a word processor, that is, apparatuses having no character selection dial.

As described above, the character input apparatus of the second aspect of the present invention comprises:

input state judging means for judging a current character-string-input-state; and operation-corresponding-action executing means for executing, when an operation signal is supplied from any one of cursor moving keys, an action in accordance with an operation-corresponding-action content determined by the operation signal supplied from the cursor moving key and the character-string-input-state judged by the input sate judging means.

With this configuration, each of the cursor keys is allocated two functions (one of them is a function of moving the cursor) so that the number of keys provided, and the area necessary for the key input unit can be reduced. Further, there is no need to operate another key simultaneously with or before the operation of the cursor moving key for distinguishing the two functions allocated to the cursor moving key.

According to the character input apparatus of the third aspect of the present invention, since cursor moving keys are arranged inside of a torus-shaped portion of character selecting means for outputting a signal corresponding to a desired character out of a plurality of candidate characters arranged in a prescribed order on the torus-shaped portion, the area necessary for the key input section can be reduced.

Next, referring to FIGS. 1 to 6 and FIGS. 13 to 17, an embodiment of a seal producing apparatus to which the character input apparatus of the fourth and fifth aspects of the present invention is applied.

In the description of the embodiment according to the fourth and fifth aspects of the present invention, only the features different from those of the first embodiment according to the first aspect of the invention will be detailed. With respect to the features not detailed, the explanations given to the embodiment of the first aspect of the present invention are applied appropriately. The same members as employed in the first aspect of the present invention is denoted by the same reference numerals.

The embodiment of the seal producing apparatus according to the fourth and fifth aspects of the present invention, roughly speaking, comprises an electrical mechanism (including an information processing unit and imprint transfer control unit) shown in FIG. 1 and a mechanical-optical mechanism (including a printing unit and light irradiation unit) shown in FIG. 2. Also, the outer appearance, the character selection dial section 11B, the display unit 33, and the plate-making sheet 60 are configured similarly to the embodiment of the first aspect of the present invention, as shown in FIGS. 3, 4, 5 and 6, respectively. The characteristic features of the embodiment according to the fourth and fifth aspects of the present invention are described in the following.

First, in this embodiment, as shown in FIG. 13, the dictionary data for kana-kanji conversion stores data as to spaces, numeric characters, punctuation symbols as well as ordinary data used for kana-kanji conversion. In an area for candidate kanji codes employing a code of an en space as a reading code, codes of an em space and an en space are stored. Further, in an area for candidate kanji code employing a code of an em numeric character "1", a code of an em numeric character "1", and an en a numeric character "1", and a code a ⅓ reduced size numeric character "1" are stored. Further, in an area for candidate kanji codes employing a code of kuten (Japanese punctuation mark corresponding a period in English punctuation mark), codes of kuten and period are stored. The ⅓ reduced size numeric character "1" is a numeric character whose width is reduced to ⅓ of the width of an em numeric character on a printed image basis.

As the fonts for display stored in the CG-ROM 24, while not shown in the drawings, fonts for en spaces, fonts of en numeric characters, and fonts for ⅓ reduced numeric character are provided. These fonts are provided as fonts each having a size of an ordinary one character.

Figure 14:
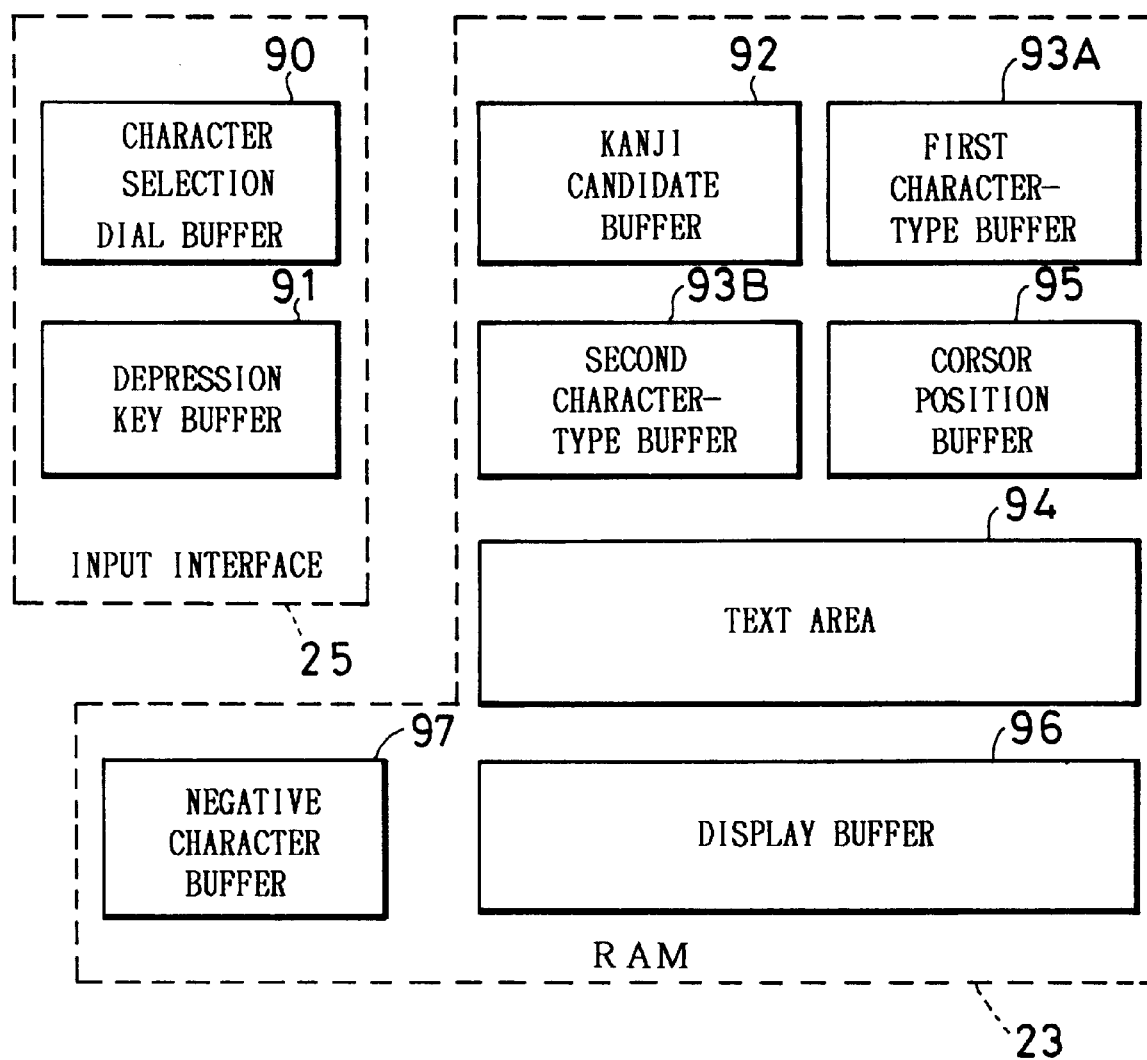
FIG. 14 is a view showing a configuration of buffers and other components of a RAM 23 at the time of character input in the embodiments according to the fourth and fifth aspects of the present invention.

Further, as shown in FIG. 14, unlike the first aspect of the present invention, the RAM 23 has a negative character buffer 97 for buffering a negative character (tentatively determined character) in addition to the buffers 92, 93A, 95 and 96 and the text area 94.

Further, the procedure performed by the user using the seal producing apparatus according to the embodiment of the fourth and fifth aspects of the present invention is similar to that of the first aspect of the present invention.

However, the embodiment according to the fourth and fifth aspects of the present invention is characterized in that the objects of the kana-kanji conversion are increased. In the following description, the procedures affected by the increase in the object of the kana-kanji conversion.

Figure 16:
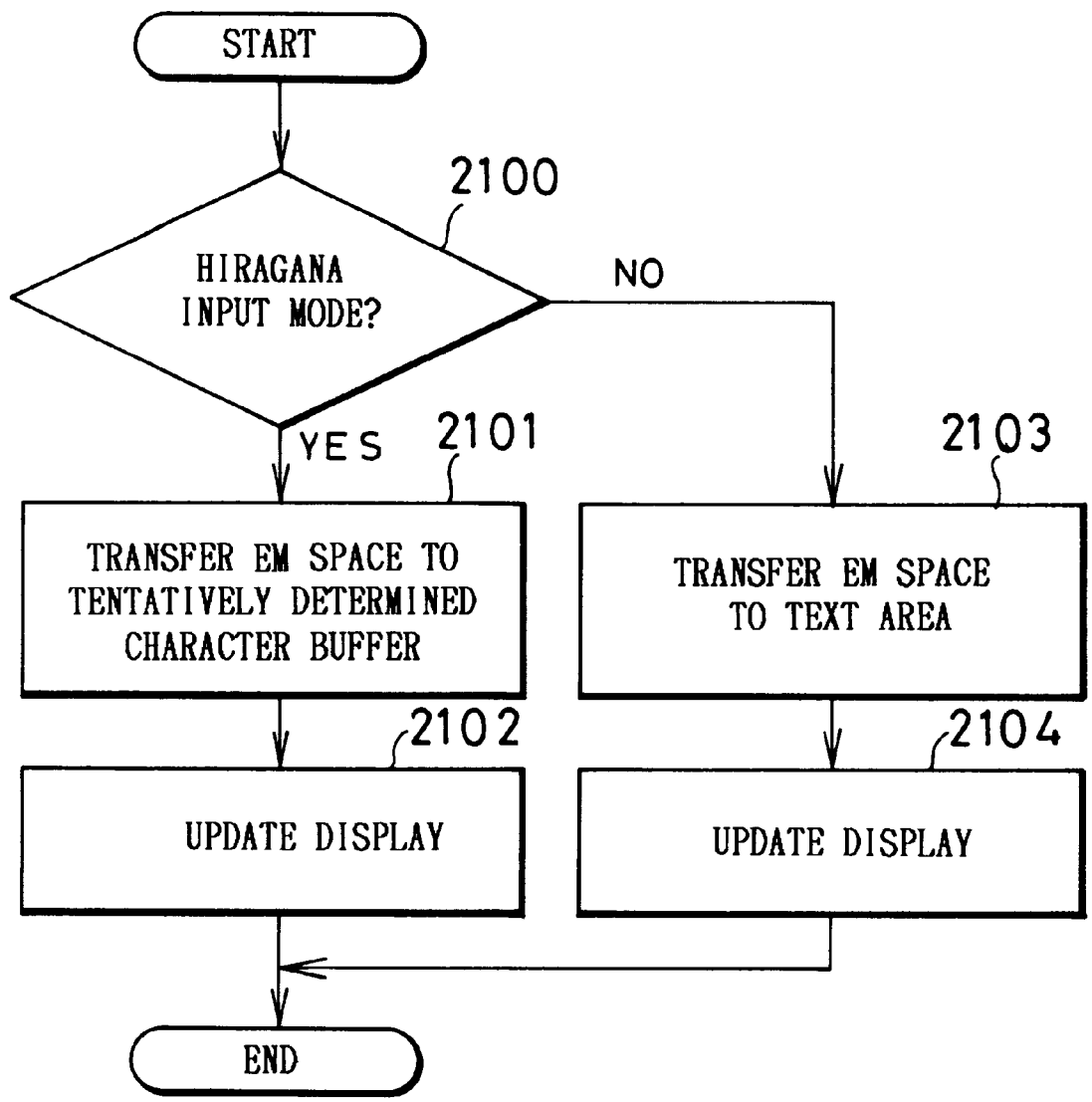
FIG. 16 is a flowchart of processing executed when an 1instruction for selecting the candidate space in the embodiment according to the fourth and fifth aspects of the present invention.

FIG. 16 shows processing executed when, under the state that the character selection dial 85 designates a space (en space) and the code of a space is stored in a character selection dial buffer 90, the selection slewing key 80 is operated and the code of a space is stored in the depression key buffer 91, so that the CPU 21 is interrupted. In FIG. 16, the steps of judging whether the instruction is as to selection or as to slewing are omitted, and processing executed when a selecting instruction is given is shown.

The CPU 21 first judges based on the contents stored in the first character type buffer 93 whether the current character input mode is a hiragana input mode, or another mode, that is, a katakana input mode or an alphabet input mode (step 2100).

When the character input mode is a hiragana input mode, a few bits are added to the space code stored in the character selection dial buffer 90 to be converted into an en space code, so that the en space code thus converted is stored in the negative character buffer 97 as a tentatively determined character, and concurrently the character selection dial buffer 90 is cleared (step 2101). Thereafter, the display buffer 96 is updated in accordance with the contents stored in the cursor position buffer 95, the text area 94 and the negative character buffer 97, the en space is displayed as a negative character together with already inputted character string (a positive character or a negative character) on the liquid crystal display 33A (step 2102).

When it is decided that the input mode is a katakana input mode or an alphabetic character input mode on the judgment at step 2100, the CPU 21 converts the space code into a en space code by adding a few bits to the space code stored in the character selection dial buffer 90 so as to store the en space as a determined character in the text area 94, and clears the character selection dial buffer 90 (step 2103). Thereafter, the CPU 21 updates the display buffer 96 in accordance with the contents stored in the cursor position buffer 95, the text area 94 and the negative character buffer 97, and causes the liquid crystal display 33A to display the en space as a positive character together with the already inputted character string consisting of positive characters or negative characters (step 2104).

In this embodiment, in view of the fact that the pitch between the characters cannot be made wide in a seal, the en space is selected as a basic space and the above processing is executed.

Incidentally, under the state that a numeric character (en numeric character) is in the flashing state, when the selection slewing key is operated, substantially the same processing is executed, and therefore the explanation thereof is omitted. Further, under the state that kuten is in the flashing state, when the selection slewing key 80 is operated, substantially the same processing is executed, and therefore the description thereof is omitted. Note that, when kuten is displayed in a flashing manner, the input mode is a hiragana input mode or a katakana input mode (determined by the first character type buffer 93A). Accordingly, in an alphabet input mode, even when the character selection dial 85 indicates the same position, the character is displayed as a period in a flashing manner.

Next, referring to the flowchart shown in FIG. 15, processing executed when a cursor downward moving key 83 is operated as a conversion key under the state that the negative character (a tentatively determined character) is displayed will be described in detail.

Figure 15:
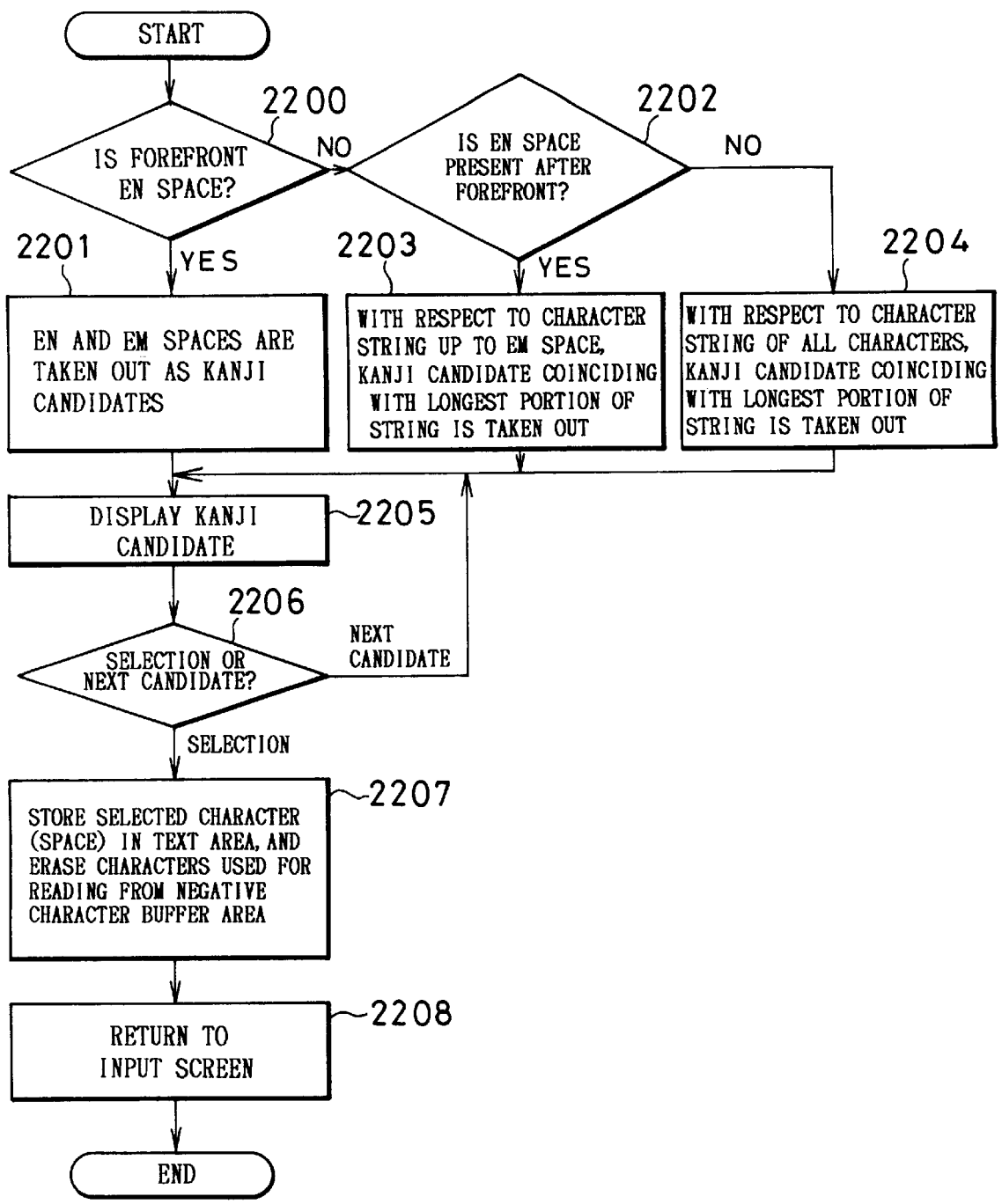
FIG. 15 is a flowchart of processing executed when an instruction of selecting the tentatively determined character is issued in the embodiments according to the fourth and fifth aspects of the present invention.

Note that FIG. 15 omits steps of judging whether an instruction for cursor downward movement or instruction for conversion is issued, and shows processing executed when an instruction for conversion is issued. Further, for simplification of explanation, the following explanation will be made assuming that, as kana-kanji conversion information other than an ordinary kana-kanji conversion information, only a space is described. Note that when numeric characters or punctuation symbols are stored as kana-kanji conversion information, processing is executed similarly to the processing in FIG. 15.

The CPU 21 first judges whether or not the character at the forefront of a character string consisting of tentatively determined characters which are located leftward with respect to the cursor position (inclusive of the character at the cursor position) and to be subjected to conversion (which can be specified based on the contents stored in the cursor position buffer 95) is an en space (step 2200).

When a positive result is obtained at step 2200, kanji candidates (in this case, an em space and en space) are taken out by accessing dictionary data for kana-kanji conversion, and are stored in a kanji candidate buffer 92 (step 2201).

When a negative result is obtained at step 2200, the CPU 21 judges whether or not an en space is present in the middle of the character string consisting of tentatively determined characters which are positioned leftward with respect to the cursor(inclusive of the cursor position) and to be converted (step 2202). At this step, when a positive result is obtained, the CPU 21 searches, with respect to the character string consisting of tentatively determined characters positioned leftward from the en space (inclusive of the cursor position), the dictionary data for kana-kanji conversion for kanji candidate by finding a kanji coinciding with a longest portion of the character string of the tentatively determined characters, and causes the kanji candidate buffer 92 to store the kanji candidate (step 2203). When a negative result is also obtained at step 2202, the CPU 21 searches the dictionary data for kana-kanji conversion for a kanji candidate by finding a kanji coinciding with a longest portion of the character string consisting of the tentatively determined characters, and stores the kanji candidate into the kanji candidate buffer 92 (step 2204).

After a kanji candidate is obtained in accordance with the above procedure, the display buffer 96 is operated based on the contents stored in the kanji candidate buffer 92, all or a part of the kanji candidates are displayed on the liquid crystal display 33A such that a cursor is added to any one of the kanji candidates (step 2205). Thereafter, it is judged whether or not the user has instructed selection (by operating the key 80) or display of a next candidate (by operating the key 82 or 84) (step 2206).

At this step, display of a next candidate is instructed, the CPU 21 returns to step 2205, and changes the kanji candidate having been displayed with a cursor to a new kanji candidate, and the other kanji candidates having been displayed are also changed as occasion demands.

When selection of the kanji candidate is instructed, the selected kanji (in some cases, an en space or an em space) stored in the kanji candidate buffer 92 is stored in the text area 94 for storing determined characters, and concurrently the negative character used for the reading of the selected kanji is deleted from the negative character buffer 97 (step 2208). Thereafter, the display buffer 96 is operated based on the contents stored in the text area 94 and the negative character buffer 97, etc. so as to return the display to a character input screen.

Through the processing described above, an en space having been displayed in the form of a negative character can be determined as an em space or an en space as occasion demands.

When a nonconversion key (81) is operated with respect to the negative character of an en space, while the flowchart of the processing is not shown, nonconverting action is executed as in the case of other negative characters, and the en space is stored in the text area as a determined character (positive character) while the flowchart of the processing is not shown.

Accordingly, a character string consisting of negative characters "やまだたろう" can be easily converted by converting or nonconverting operation into a character string "山田太郎" in which the space is an em space or an en space.

As described above, under the katakana input mode or alphabet input mode, a space inputted though the character selection dial 85 is always determined as an en space. Accordingly, in this embodiment, an em space is adapted to be inputted through symbol input processing. In other words, in the course of inputting a character string of katakanas or a character string of alphabets, en space can be inputted without changing the input mode to a hiragana input mode.

Figure 17:
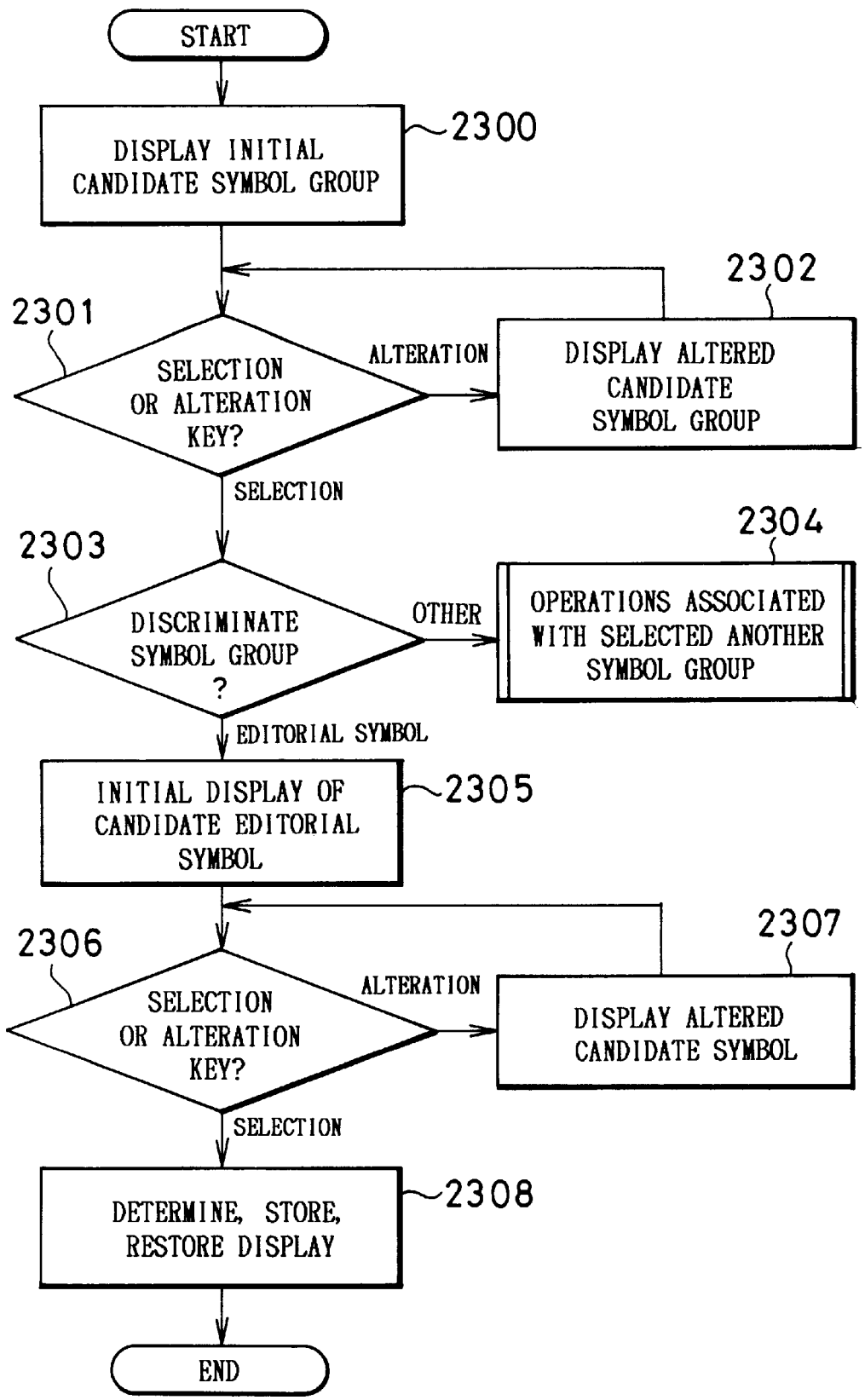
FIG. 17 is a flowchart of a processing executed when an em space is inputted as a symbol in the embodiment of the fourth and fifth aspects of the present invention.

FIG. 17 is a flowchart of processing in which an em space is inputted through symbol input processing.

When the symbol key in the function key section 11A is operated, the CPU 21 starts the processing program shown in FIG. 17 which is stored in ROM 22. First, at step 2300, the CPU 21 causes the liquid crystal display 33A to display an initial symbol group candidate. The symbol groups comprises several varieties, such as a symbol group of units, a symbol group of punctuation symbols, a symbol group of living creatures, a symbol group of vehicles, and a symbol group of editorial symbols. As an initial candidate of symbol groups, a symbol group which is most frequently used of all the symbol groups, or symbol groups presented with the aid of learning function as a symbol group selected immediately before the operation.

Thereafter, the CPU 21 judges whether or not the selection key (80) or alteration key (82 and 84) is operated. When the alteration key is operated, a current candidate symbol group (a symbol group displayed in a flashing manner) is altered and returned to step 2301.

Under the state that a symbol group is a current candidate, when the selection key is operated, processing proceeds from step 2301 to step 2303 and judges the symbol group which is selected. When a symbol group other than the symbol group of editorial symbols is selected, the CPU 21 proceeds to the processing routine at step 2304, and executes processing of selecting a symbol within the selected symbol group.

On the other hand, when the selected symbol group is the symbol group of editorial symbols, the CPU 21 causes the liquid crystal display 33A to display any one of the editorial symbols as an initial current candidate at the step 2305. In this embodiment, the em space is displayed occupying one display area for one character. When a current candidate editorial symbol is displayed, the CPU 21 judges at 2306 whether a selection key or an alteration key is operated. When the alteration key is operated, the current candidate editorial symbol is altered at step 2307 and returned to the above-mentioned step 2306.

Under the state that an editorial symbol is in a current candidate, when a selection key is operated, processing proceeds from step 2306 to step 2308. The CPU 21 judges that the current editorial symbol is selected and determines the selection of the editorial symbol, stores the code of the editorial symbol next to the final character code stored in the text area 94. Also, by operating the display buffer 96, the CPU 21 causes the display to return to the character input screen displayed at the stage in which the symbol key is operated, and concurrently display dot patterns forming the selected editorial symbol at the position designated by the cursor when a symbol key is depressed, and ends the sequence of the processing.

Under the state that em space is a current candidate, when the selection key is operated, the CPU 21 proceeds from step 2306 to step 2308. The CPU 21 judges that an em space is selected and determines the selection and stores the code of the em space next to the final character code in the text area 94.

In this embodiment, an en space and ⅓ reduced-size numeric characters can be also introduced through symbol input in a similar manner.

When a punctuation symbol is selected as an object of kana-kanji conversion, since any selected punctuation symbol is already exists, print processing executed in the plate-making process is the same as in the conventional art. Further, print processing with respect to an en space is substantially the same as the corresponding print processing executed by a character information processing apparatus endowed with a function of inputting an en character, and the explanation thereof is omitted. In this embodiment, in order to simplify the configuration of the CG-ROM 24, fonts with respect to en numeric characters nor ⅓ reduced-size numeric characters are not provided. However, as a method of forming a font of an en numeric character or a font of ⅓ reduced-size numeric character from the existing numeric fonts, the method disclosed in the specification and the drawings of the International Patent Application PCT/JP95/02432 can be employed, and the explanation thereof is omitted.

According to this embodiment, since the en space and the em space are included in the objects of kana-kanji conversion, an en space or an em space can be inputted selectively through a kana-kanji converting action, operability in inputting spaces and variety of spaces under the hiragana mode can be enhanced. Here, since an em space, which cannot be designated by the character selection dial, is provided as a symbol, under the katakana input mode or under an alphabet input mode both types of spaces can be inputted without changing the input mode to the hiragana input mode.

Further, according to this embodiment, en numeric characters, ⅓ reduced-size numeric characters and em numeric characters are included in the objects of kana-kanji conversion, and an en numeric character, a ⅓ reduced-size numeric character, and an em numeric character can be selectively inputted. With this configuration, operability in inputting numeric characters and variety in numeric characters under the hiragana input mode can be enhanced. Also, in this case, reduced-size numeric characters which cannot be designated by the character selection dial is provided as symbols under the katakana input mode and alphabet input mode and therefore, various sizes of numeric characters can be inputted without changing the input mode into a hiragana input mode.

Note that the reducing ratio of the numeric characters to which kana-kanji converting operation is applied is not limited to ½ and ⅓, and accordingly other ratios can be employed. Further, the apparatus may be configured such that the numeric characters can be enlarged in the width direction. Furthermore, the object of the kana-kanji converting operation is not limited to numeric characters, and accordingly alphabets can be included in the object of kana-kanji converting operation.

Further, according to this embodiment, the Japanese punctuation symbols and their corresponding European language punctuation symbols are included in the objects of a kana-kanji conversion, and Japanese punctuation symbols and their corresponding European language punctuation symbols can be selectively inputted through kana-kanji converting operation. With this configuration, operability in inputting the punctuation symbols and variety of the punctuation symbols under a hiragana input mode can be enhanced.

Note that apparatuses to which the character input apparatus according to the fourth and fifth aspects of the present invention can be applied are not limited to the seal producing apparatus. The fourth and fifth aspects of the present invention can be applied to the tape printing apparatuses, personal computers, word processors, and the like, and to apparatuses having no character selection dial.

In this embodiment, the en space was chosen as a basic space, but the em space may be chosen as a basic space.

Further in this embodiment, spaces or numeric characters inputted in a hiragana input mode [including a hiragana input mode employing romaji conversion (here, romaji is a method of writing Japanese in Roman characters)] are included in the objects of kana-kanji conversion. However, spaces and numeric characters inputted in a katakana input mode or an alphabet input mode may be included in the objects of kana-kanji conversion. Further, spaces or numeric characters inputted in a symbol selecting mode may be included in the objects of kana-kanji conversion. Further, punctuation symbols may be treated similarly.

As described above, according to the fourth aspect of the present invention, with respect to the characters having different character attributes, a tentatively determined character can be converted into a character associated the tentatively determined character. With this configuration, for example, it is possible to include en and em spaces in the objects of kana-kanji conversion, and to perform selective input between an en space and an em space through a kana-kanji converting operation. Likewise, it is possible to include reduced-size numeric characters, enlarged-size numeric characters, and em numeric characters in the objects of kana-kanji conversion, and to perform selective input among a reduced-size numeric character, enlarged-size numeric character and em numeric characters through a kana-kanji converting operation. Accordingly, operability can be enhanced when inputting, for example, a character string consisting of a kanji, a space and a kanji in this order, and a character string consisting of a kanji, a numeric character and a kanji in this order.

Further, according to the fifth aspect of the present invention, with respect to editorial symbols of different languages, a tentatively determined character can be converted into a character associated the tentatively determined character. With this configuration, for example, it is possible to include Japanese punctuation symbols and their corresponding European language punctuation symbols in the objects of kana-kanji conversion, and to perform selective input between Japanese punctuation symbols and their corresponding European punctuation symbols through a kana-kanji converting operation. Accordingly, operability is enhanced when inputting, for example, a character string consisting of a kanji, a punctuation symbol (in particular, an European language punctuation symbol) and a kanji in this order.

Although the preferred embodiments of the present invention have been described above, it should be understood that the present invention is not limited thereto and that other modifications will be apparent to those skilled in the art without departing form the spirit of the invention.

The scope of the present invention, therefore, is to be determined solely by the appended claims.

What is claimed is:

1. A character input apparatus comprising:

character selecting means for outputting a signal corresponding to a desired character among a plurality of candidate characters arranged in a prescribed order;

selection determining means for determining selection of a character associated with the signal outputted from the character selecting means;

display means for displaying an inputted character string; and display control means for exercising control of display such that a candidate character is displayed at a prescribed display area of said display means in response to the signal sent from the character selecting means, and that the respective characters having been displayed in the display areas are shifted and displayed when selection of a character out of the candidate characters is determined by the selection determining means;

said display control means causing the display means to display the candidate character at the prescribed display area in a flashing manner;

said display control means causing the display means to display, when selection of a character out of the candidate characters is determined by the selection determining means and the selected character is shifted, the character thus selected and shifted is displayed in a manner other than the flashing manner; and said display control means causes the display means to display, when selection of a character out of the candidate characters is determined by the selection determining means and the character is shifted, the character thus selected and shifted together with a cursor.

2. A character input apparatus comprising:

a plurality of cursor moving keys;

means for inputting a character string;

character string state judging means for judging a current state of the input character string wherein the state of the input character string judged by the character string state judging means is a state assumed by a displayed character corresponding to a desired character among a plurality of candidate characters arranged in a prescribed order; and operation-corresponding-action executing means for executing, when an operation signal is supplied from any one of said cursor moving keys, a cursor moving action when said character string state judging means judges a first state of the displayed character and an action other than a cursor moving action when said character string state judging means judges a second state of the displayed character;

said operation-corresponding-action executing means comprises action content storing means for storing an operation-corresponding-action content together with a corresponding combination of a type of the state of the input character string and a type of an operation signal, the operation-corresponding-action content representing either the cursor moving action or the action other than a cursor moving action associated with character input executed when the operation signal is generated by any one of the cursor moving keys.

3. A character input apparatus comprising:

input state judging means for judging a current character-string-input-state;

operation-corresponding-action executing means for executing, when an operation signal is supplied from any one of cursor moving keys, an action in accordance with an operation-corresponding-action content determined by the operation signal supplied from the cursor moving key and the character-string-input-state judged by the input state judging means; and character selecting means, having a torus-shaped portion, for outputting a signal corresponding to a desired character out of a plurality of candidate characters arranged in a prescribed order on the torus-shaped portion, wherein the cursor moving keys are arranged inside of the torus-shaped portion of the character selecting means.

4. A character input apparatus comprising character selecting means, having a torus-shaped portion, for outputting a signal corresponding to a desired character out of a plurality of candidate characters arranged in a prescribed order on the torus-shaped portion, and cursor moving keys arranged inside of the torus-shaped portion of the character selecting means.

5. A character input apparatus comprising:

input means for inputting a tentatively determined character which can be converted into an associated character; and converting means for converting the tentatively determined character into the associated character, wherein the converting means comprises:

conversion instructing means for issuing an instruction for converting the tentatively determined character;

conversion-information storing means for storing dictionary data for kana to kanji conversion alone with data for a plurality of candidate characters each of which is associated with the tentatively determined character and which can be further converted;

said plurality of the candidate characters associated with the tentatively determined character being characters which differ only in character width;

candidate extracting means for extracting a kanji associated with an input kana when the instruction for converting the tentatively determined character is a kana-kanji conversion instruction and for extracting a character of the plurality of candidate characters which can be converted from the conversion-information storing means when the instruction for conversion is an instruction for converting the tentatively determined character to an associated candidate character; and candidate displaying means for displaying the candidate extracted by the candidate extracting means.

6. The character input apparatus according to claim 5, wherein the conversion information storing means stores relationships between alphabets and numeric characters each having an ordinary width and alphabets and numeric characters each having a width different from the ordinary width.

7. The character input apparatus according to claim 6, wherein the input means can input alphabets and numeric characters each having an ordinary width as tentatively determined characters.

8. The character input apparatus according to claim 5, wherein the conversion information storing means stores relationships among a plurality of spaces having different widths.

9. The character input apparatus according to claim 8, wherein the input means is capable of inputting at least one of the spaces having different widths as a tentatively determined character.

10. A character input apparatus comprising:

input means for inputting a tentatively determined character which can be converted into an associated character; and converting means for converting the tentatively determined character into the associated character, wherein the converting means comprises:

conversion instructing means for issuing an instruction of converting the tentatively determined character;

conversion-information storing means for storing dictionary data for kana to kanji conversion along with data for a plurality of candidate characters each of which is associated with the tentatively determined character and which can be further converted;

said plurality of candidate characters being alphabets and numeric characters associated with kana characters;

candidate extracting means for extracting a kanji associated with an input kana when the instruction for converting the tentatively determined character is a kana-kanji conversion instruction and for extracting a character of the plurality of candidate characters from the conversion-information storing means when the instruction for conversion is an instruction for converting the tentatively determined character to an associated candidate character; and candidate displaying means for displaying the candidate extracted by the candidate extracting means.

11. A character input apparatus comprising:

input means for inputting a tentatively determined character which can be converted into an associated character; and converting means for converting the tentatively determined character into the associated character, wherein the converting means comprises:

conversion instructing means for issuing an instruction of converting the tentatively determined character;

conversion-information storing means for storing dictionary data for kana to kanji conversion along with data for a plurality of candidate characters each of which is associated with the tentatively determined character and which can be converted;

said plurality of candidate characters being katakanas associated with hiraganas;

candidate extracting means for extracting a kanji associated with an input kana when the instruction for converting the tentatively determined character is a kana-kanji conversion instruction and for extracting a character which can be converted from the conversion-information storing means when the instruction for conversion is an instruction for converting the tentatively determined character to an associated candidate character; and candidate displaying means for displaying the candidate extracted by the candidate extracting means.

12. A character input apparatus comprising:

input means for inputting a tentatively determined character which can be converted into an associated character; and converting means for converting the tentatively determined character into the associated character, wherein the converting means comprises:

conversion instructing means for issuing an instruction of converting the tentatively determined character;

conversion-information storing means for storing dictionary data for kana to kanji conversion along with data for a plurality of candidate characters each of which is associated with the tentatively determined character and which can be converted;

said plurality of candidate characters being various types of symbols of different languages associated with the tentatively determined character which is also a symbol;

candidate extracting means for extracting a kanji associated with an input kana when the instruction for converting the tentatively determined character is a kana-kanji conversion instruction and for extracting a character which can be converted from the conversion-information storing means when the instruction for conversion is an instruction for converting the tentatively determined character to an associated candidate character; and candidate displaying means for displaying the candidate extracted by the candidate extracting means.

13. A character input apparatus comprising:

input means for inputting a tentatively determined character, and converting means for converting the tentatively determined character into the associated character, wherein the converting means comprises:

conversion instructing means for issuing an instruction of converting the tentatively determined character;

conversion-information storing means for storing dictionary data for kana to kanji conversion along with data for a plurality of candidate characters each of which is associated with the tentatively determined character and can be converted;

said candidate characters being editorial symbols of different languages;

candidate extracting means for extracting a kanji associated with an input kana when the instruction for converting the tentatively determined character is a kana-kanji conversion instruction and for extracting a character which can be converted from the conversion-information storing means when the instruction for conversion is an instruction for converting the tentatively determined character to an associated candidate character; and candidate displaying means for displaying the candidate extracted by the candidate extracting means.

14. The character input means according to claim 13, wherein the conversion information storing means stores relationships between hiraganas and katakanas of the Japanese language.

* * * * *

UNITED STATES PATENT AND TRADEMARK OFFICE
CERTIFICATE OF CORRECTION

PATENT NO.    : 6,104,381
DATED         : August 15, 2000
INVENTOR(S)   : Watanabe et al.

It is certified that error appears in the above-identified patent and that said Letters Patent is hereby corrected as shown below:

Column 7,
Line 41, "1instruction" should read -- instruction --.

Column 9,
Line 52, "←" should read -- → --.

Column 20,
Line 57, delete the last two Japanese characters;

Column 21,
Line 48, "is" should read -- ) is --.

Column 29,
Line 49, "alone" should read -- along --.

Signed and Sealed this

Thirtieth Day of October, 2001

Attest:

NICHOLAS P. GODICI
Attesting Officer    Acting Director of the United States Patent and Trademark Office